United States Patent
Park et al.

(10) Patent No.: US 10,424,221 B2
(45) Date of Patent: Sep. 24, 2019

(54) MOBILE TERMINAL AND AN OPERATING METHOD THEREOF

(71) Applicant: LG ELECTRONICS INC., Seoul (KR)

(72) Inventors: Sangkyoung Park, Seoul (KR); Junnyung Lee, Seoul (KR); Junwoo Chang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 223 days.

(21) Appl. No.: 15/328,329

(22) PCT Filed: Sep. 3, 2014

(86) PCT No.: PCT/KR2014/008283
§ 371 (c)(1),
(2) Date: Jan. 23, 2017

(87) PCT Pub. No.: WO2016/013713
PCT Pub. Date: Jan. 28, 2016

(65) Prior Publication Data
US 2017/0206803 A1     Jul. 20, 2017

(30) Foreign Application Priority Data

Jul. 21, 2014  (KR) .................. 10-2014-0091568
Jul. 22, 2014  (KR) .................. 10-2014-0092690

(51) Int. Cl.
*G09B 19/00*     (2006.01)
*A63F 13/216*    (2014.01)
(Continued)

(52) U.S. Cl.
CPC ........ *G09B 19/0038* (2013.01); *A63F 13/216* (2014.09); *A63F 13/44* (2014.09);
(Continued)

(58) Field of Classification Search
CPC .... G09B 19/0038; A63F 13/216; A63F 13/44; A63F 13/816; A63F 2300/205;
(Continued)

(56) References Cited

U.S. PATENT DOCUMENTS

2002/0165697 A1   11/2002  Min
2009/0256688 A1*  10/2009  Khan .................. A63B 24/0021
                                                340/323 R (Continued)

FOREIGN PATENT DOCUMENTS

KR    10-2002-0087840 A    11/2002
KR    10-2010-0032273 A    3/2010

*Primary Examiner* — Omkar A Deodhar
*Assistant Examiner* — Wei Lee
(74) *Attorney, Agent, or Firm* — Birch, Stewart, Kolasch & Birch, LLP

(57) ABSTRACT

A mobile terminal and an operation method are provided. The operation method of a mobile terminal includes executing a sport application, obtaining at least one of exercise information and location information on a user from a wearable device, and providing a game result or setting a team strategy of a game that the user performs on the basis of the obtained at least one of exercise information and location information.

20 Claims, 25 Drawing Sheets

(51) Int. Cl.

| | |
|---|---|
| *A63F 13/44* | (2014.01) |
| *A63F 13/816* | (2014.01) |
| *H04W 4/21* | (2018.01) |
| *H04W 4/80* | (2018.01) |
| *G06Q 50/10* | (2012.01) |
| *H04W 4/02* | (2018.01) |
| *H04W 4/04* | (2009.01) |
| *G06Q 50/00* | (2012.01) |
| *G01S 19/19* | (2010.01) |

(52) U.S. Cl.
CPC ........... *A63F 13/816* (2014.09); *G06Q 50/01* (2013.01); *G06Q 50/10* (2013.01); *H04W 4/025* (2013.01); *H04W 4/043* (2013.01); *H04W 4/21* (2018.02); *H04W 4/80* (2018.02); *A63F 2300/205* (2013.01); *A63F 2300/8005* (2013.01); *G01S 19/19* (2013.01)

(58) Field of Classification Search
CPC ... A63F 2300/8005; H04W 4/21; H04W 4/80; H04W 4/025; H04W 4/043; G06Q 50/01; G06Q 50/10; G01S 19/19
USPC .......................................................... 463/7
See application file for complete search history.

(56) References Cited

U.S. PATENT DOCUMENTS

| | | | |
|---|---|---|---|
| 2010/0103075 A1 | 4/2010 | Kalaboukis et al. | |
| 2010/0283630 A1* | 11/2010 | Alonso | H04Q 9/00 340/870.11 |
| 2010/0292600 A1* | 11/2010 | DiBenedetto | A63B 24/0062 600/520 |

\* cited by examiner

[Fig. 1]
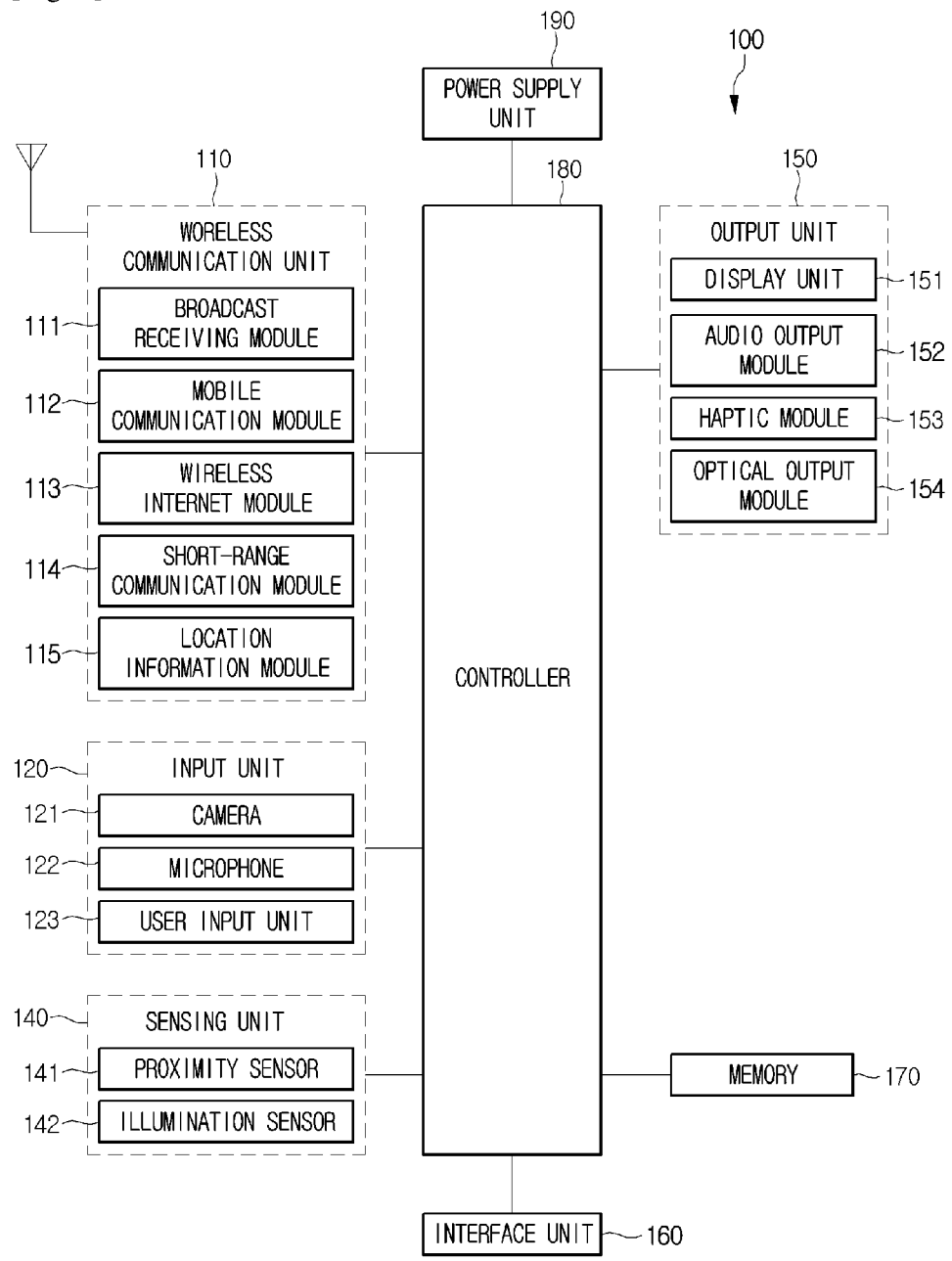

[Fig. 2]
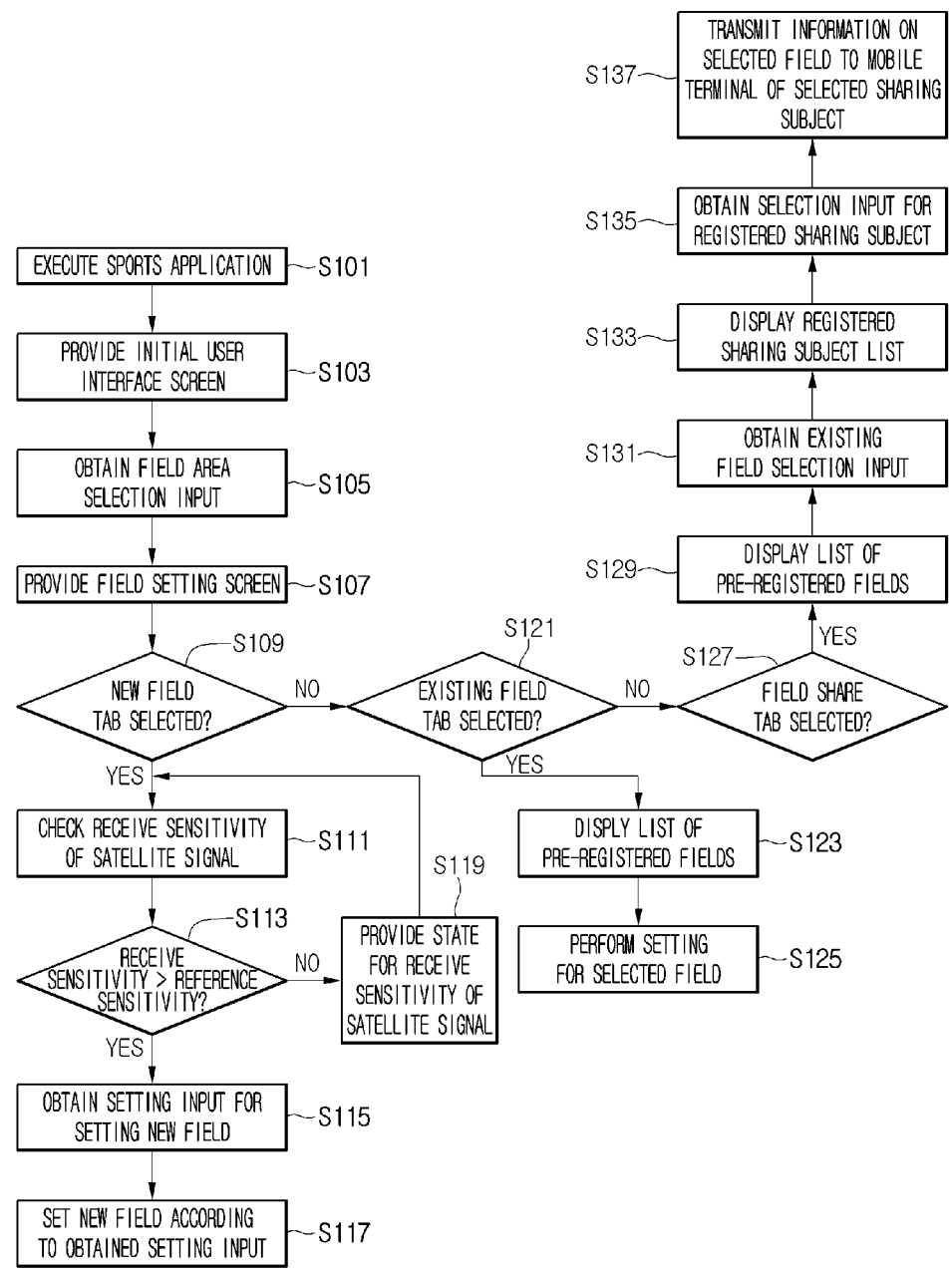

[Fig. 3]
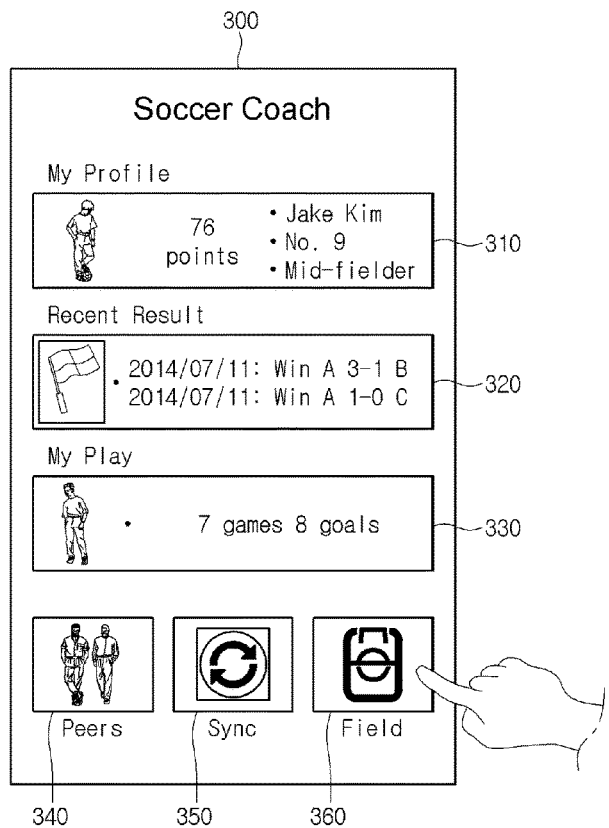
[Fig. 4]
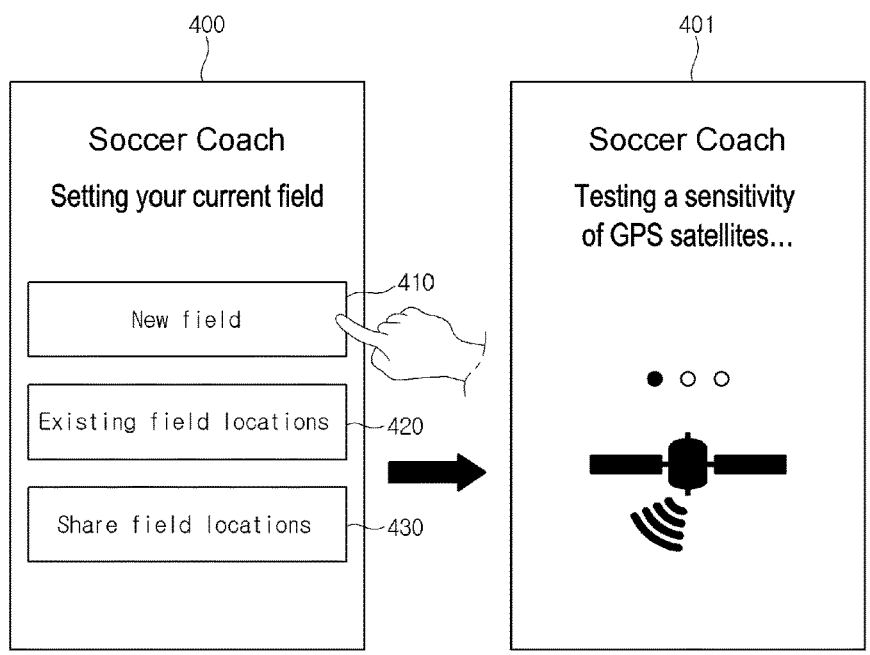

[Fig. 5]
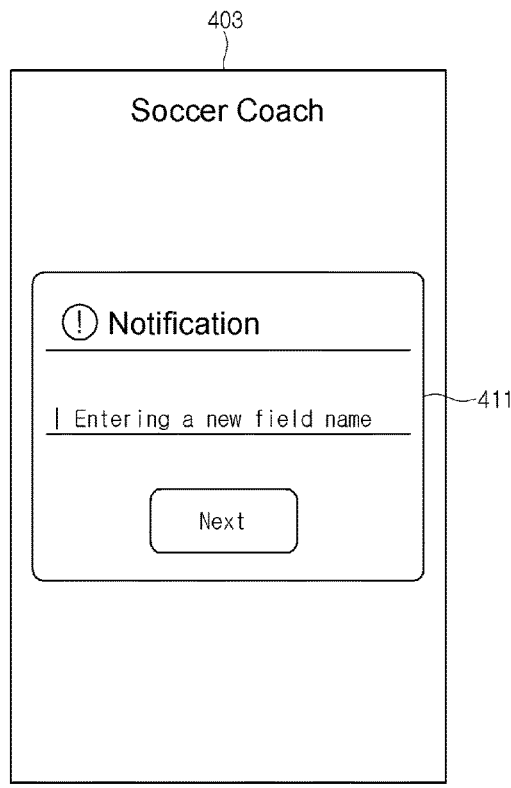
[Fig. 6]
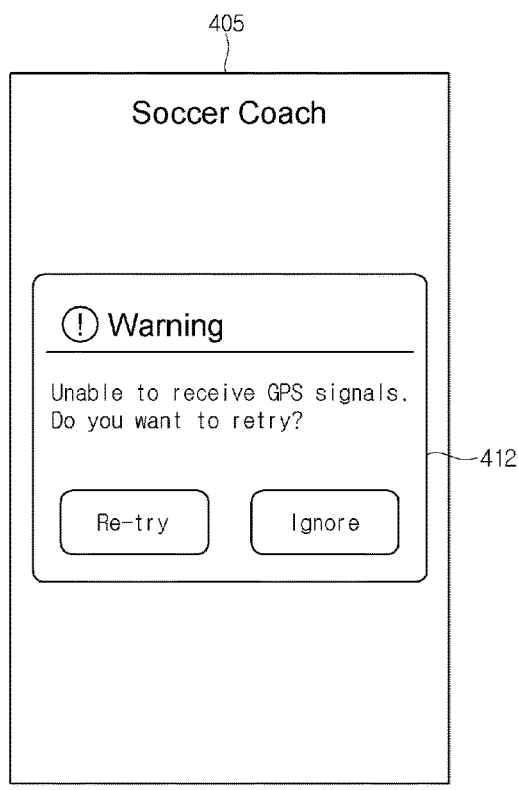

[Fig. 7]
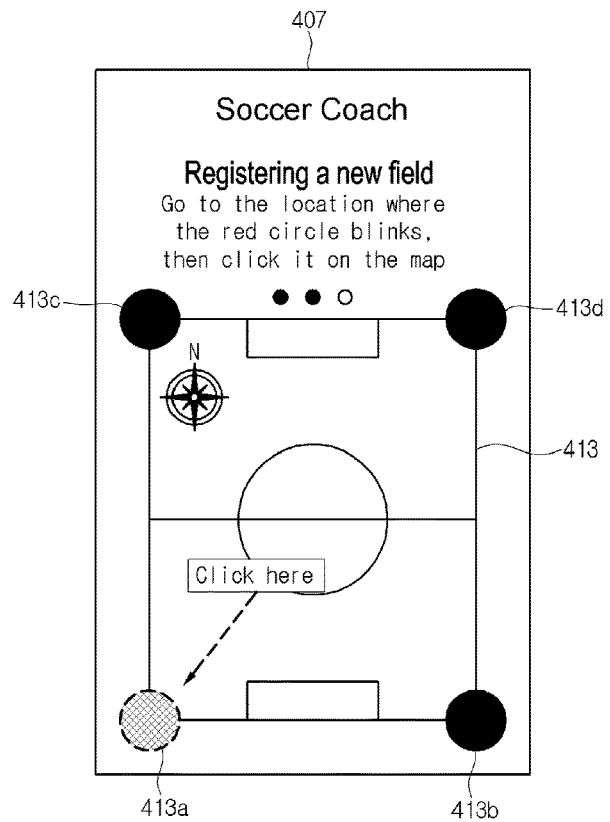
[Fig. 8]
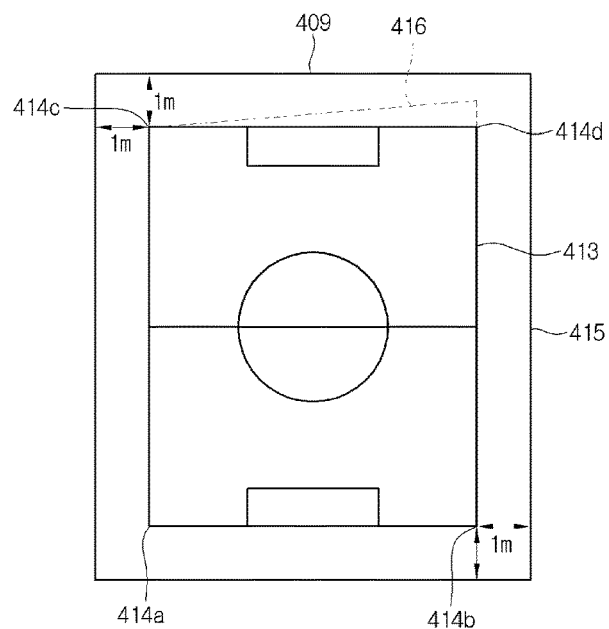

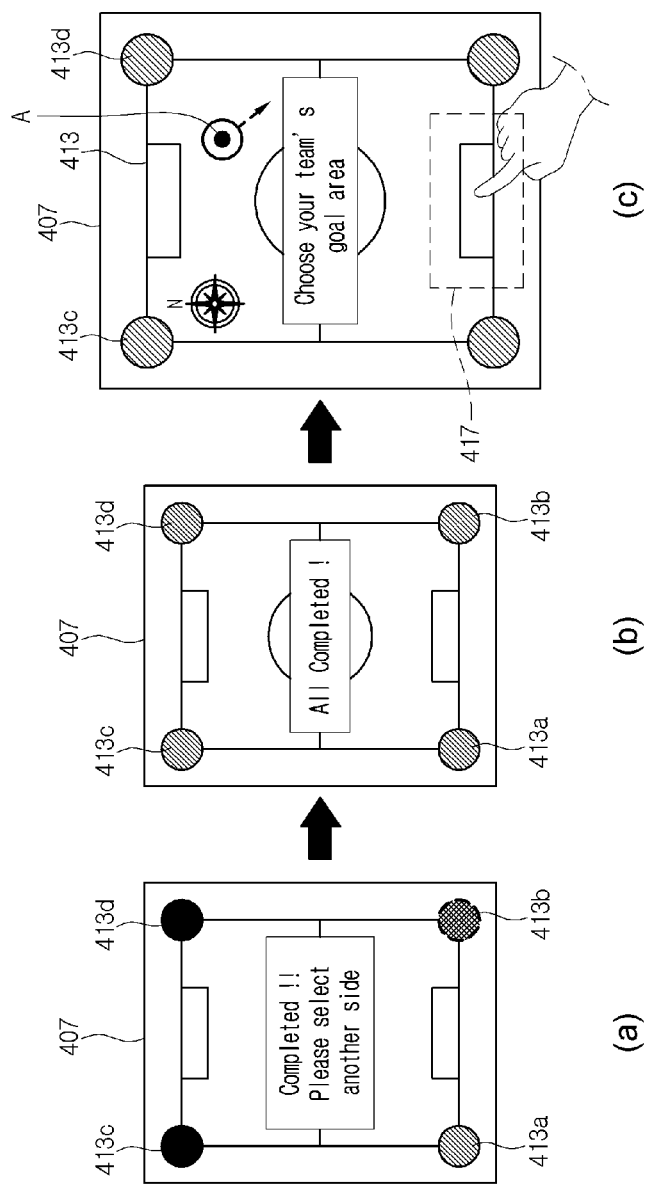

[Fig. 10]
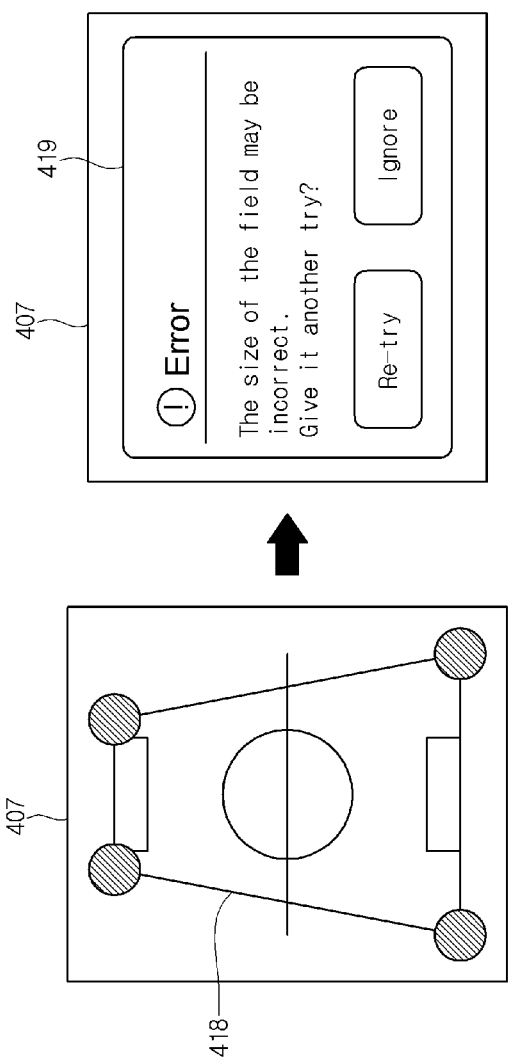

[Fig. 11]
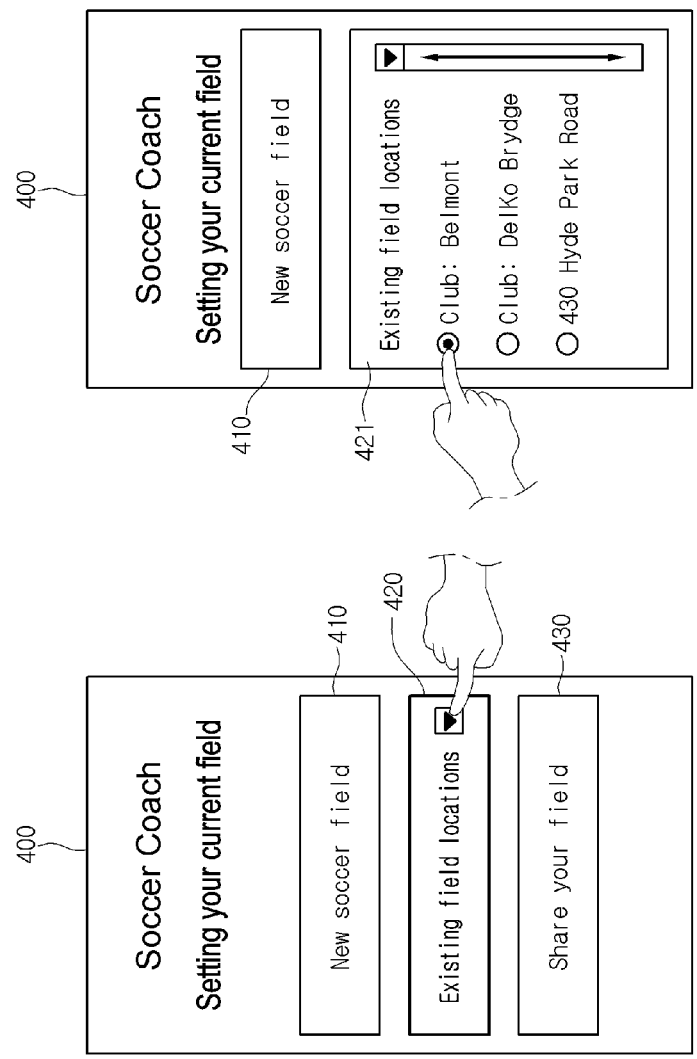

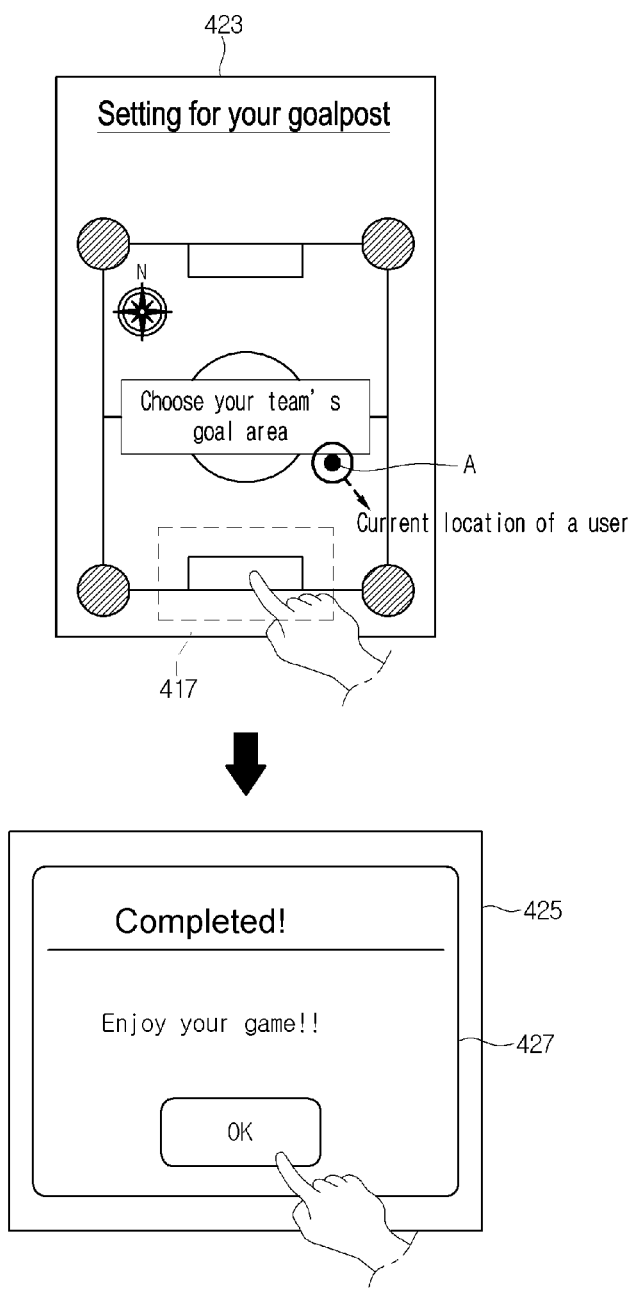
[Fig. 12]

[Fig. 13]
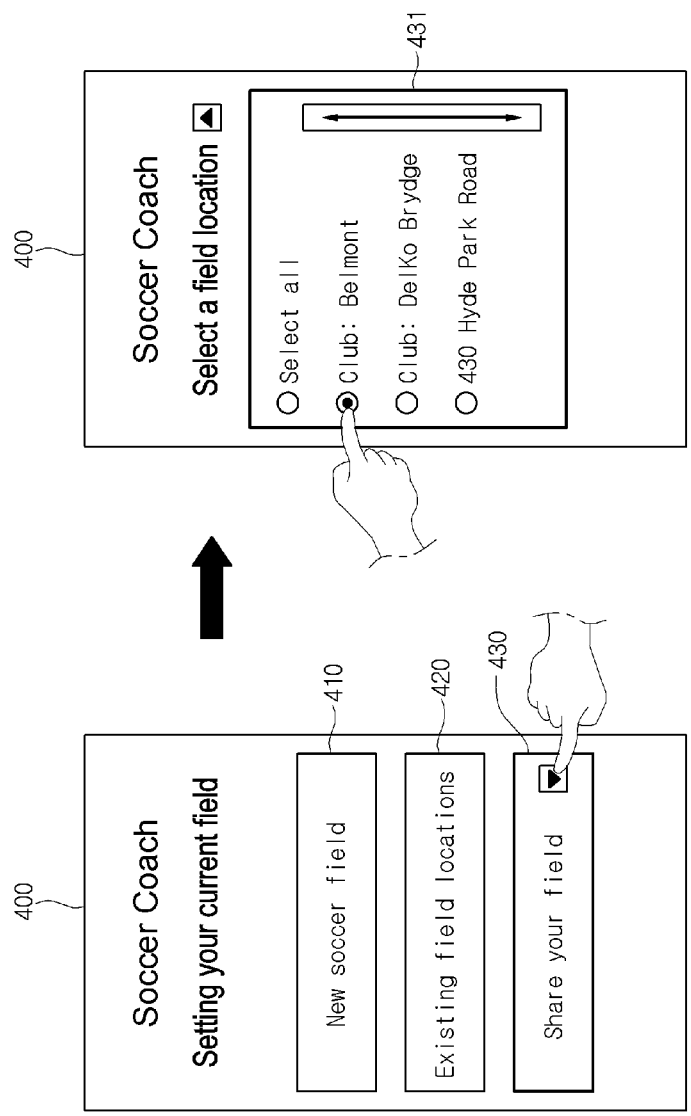

[Fig. 14]
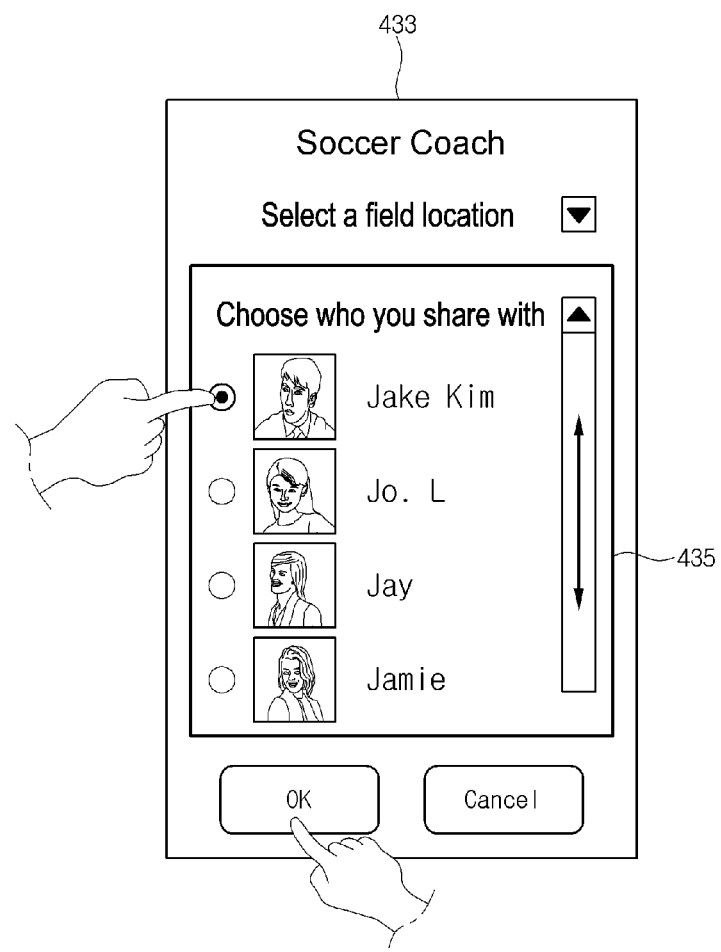

[Fig. 15]
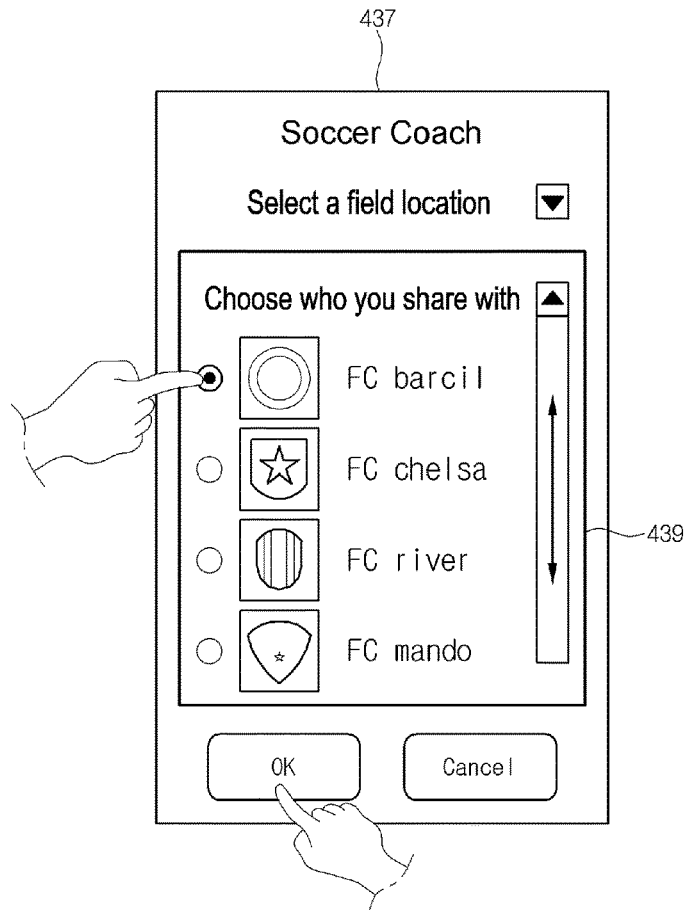
[Fig. 16]
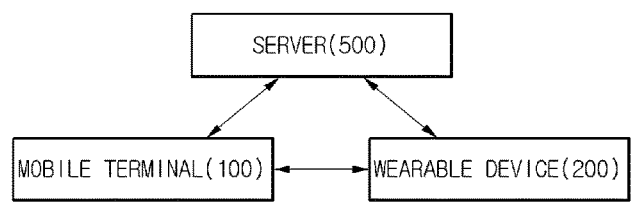
[Fig. 17]
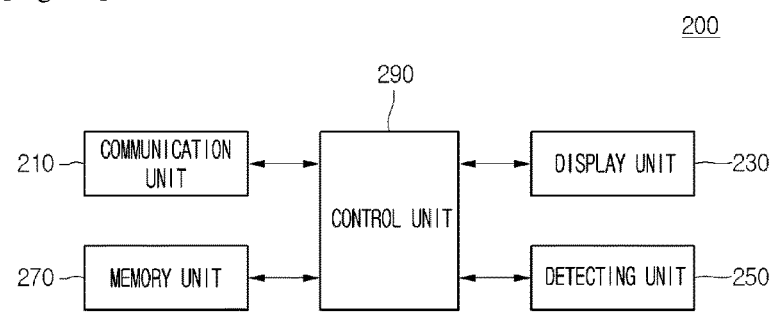

[Fig. 18]
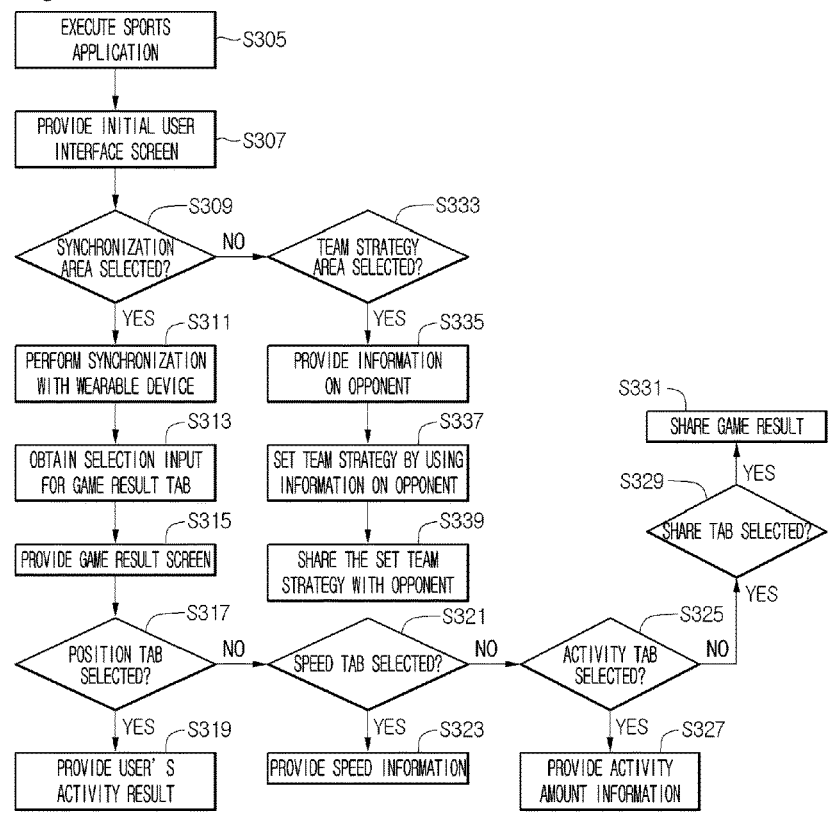
[Fig. 19]
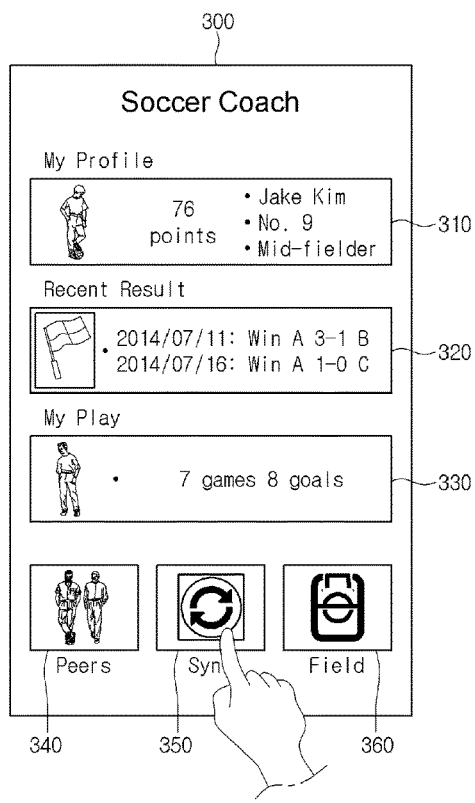

[Fig. 20]
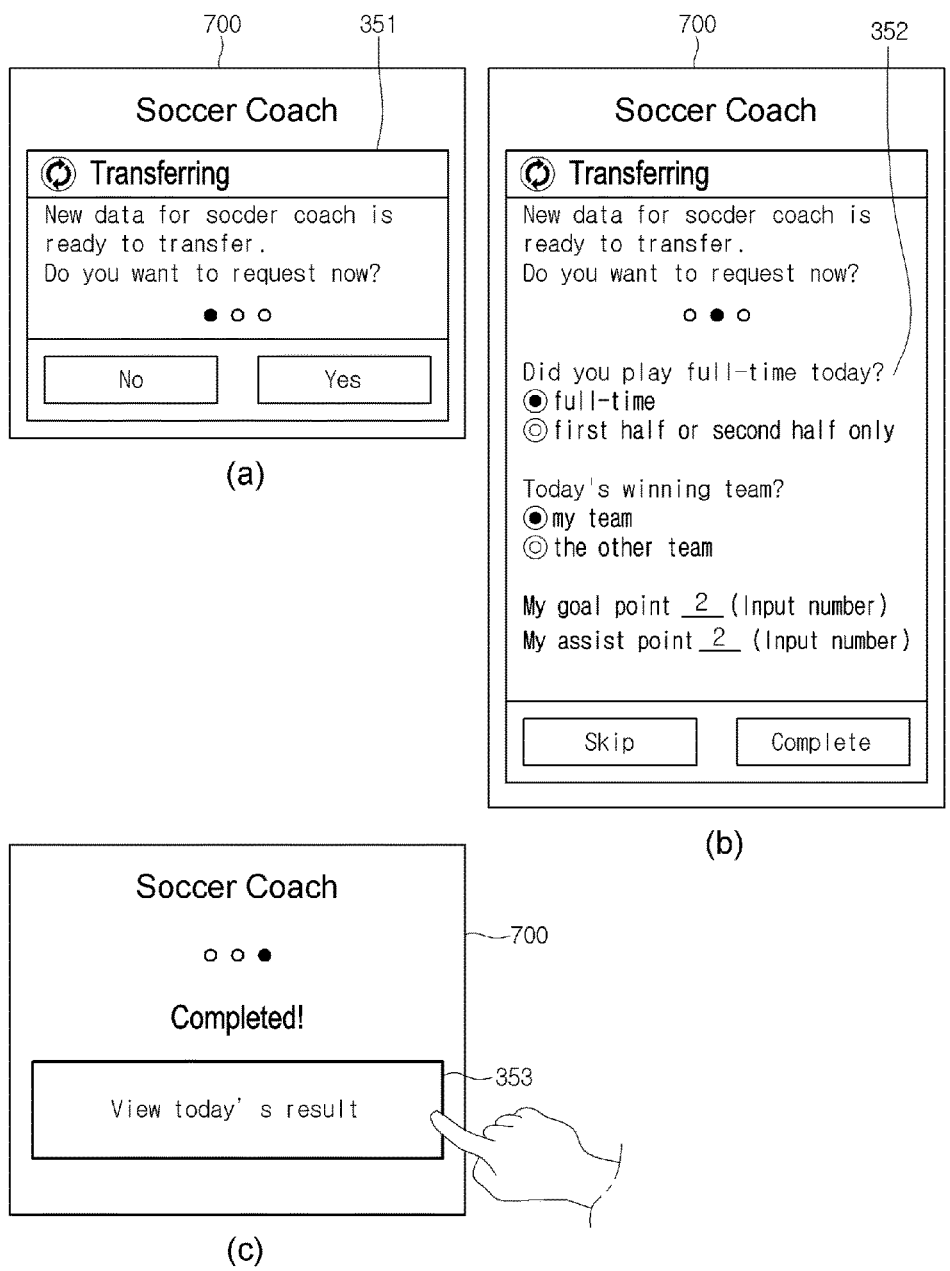

[Fig. 21]
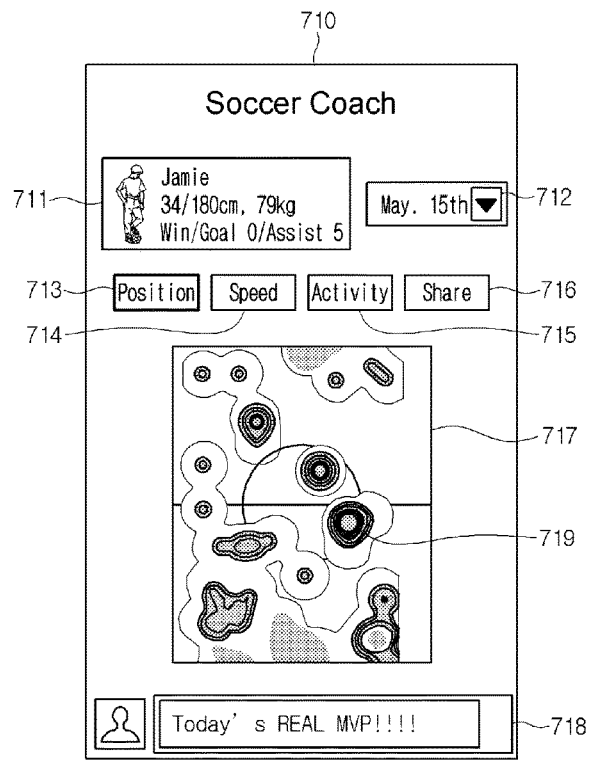
[Fig. 22]
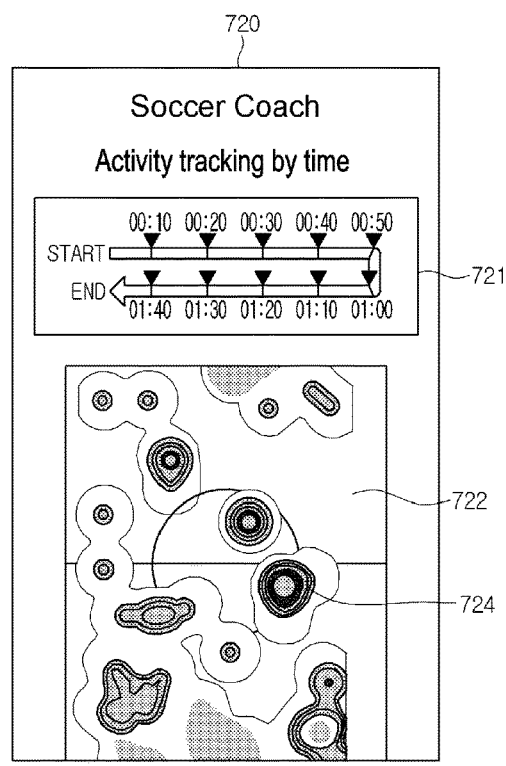

[Fig. 23]
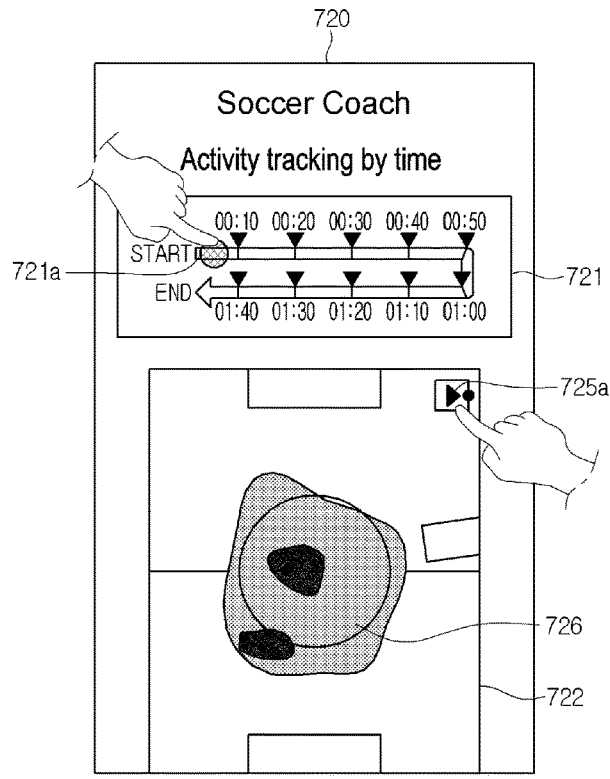
[Fig. 24]
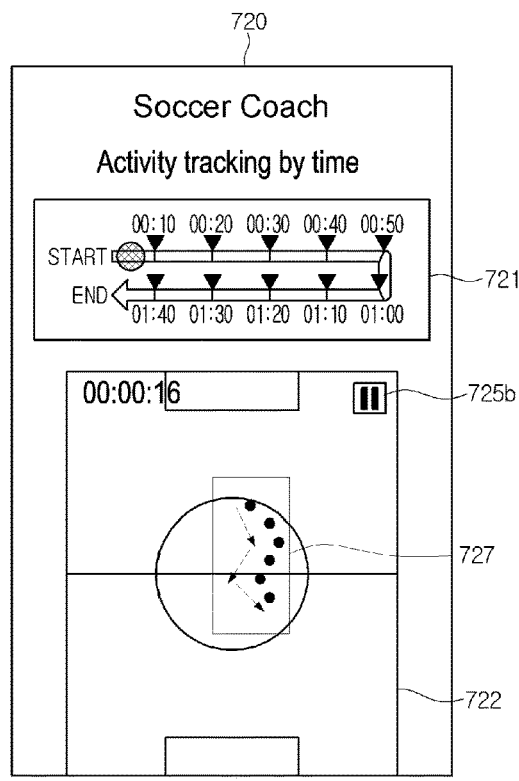

[Fig. 25]
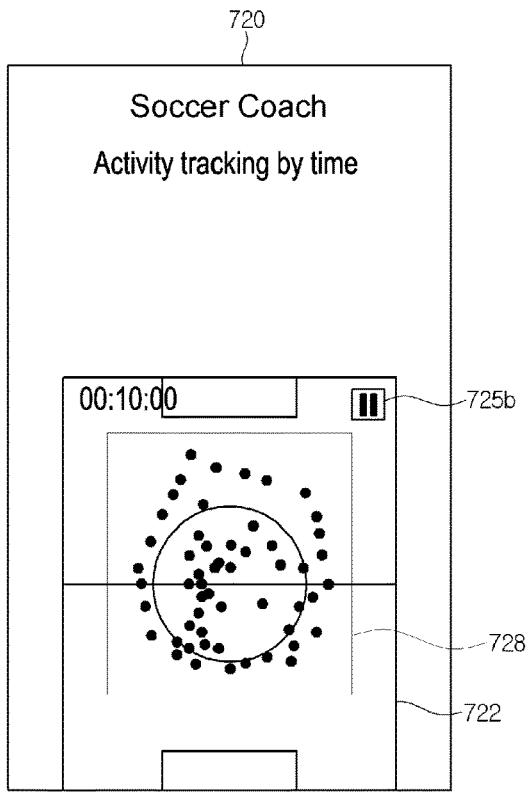
[Fig. 26]
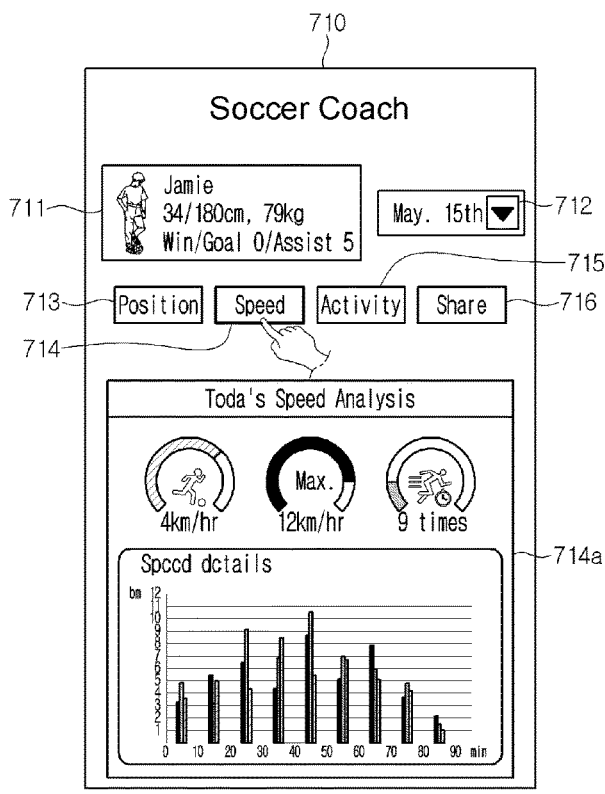

[Fig. 27]
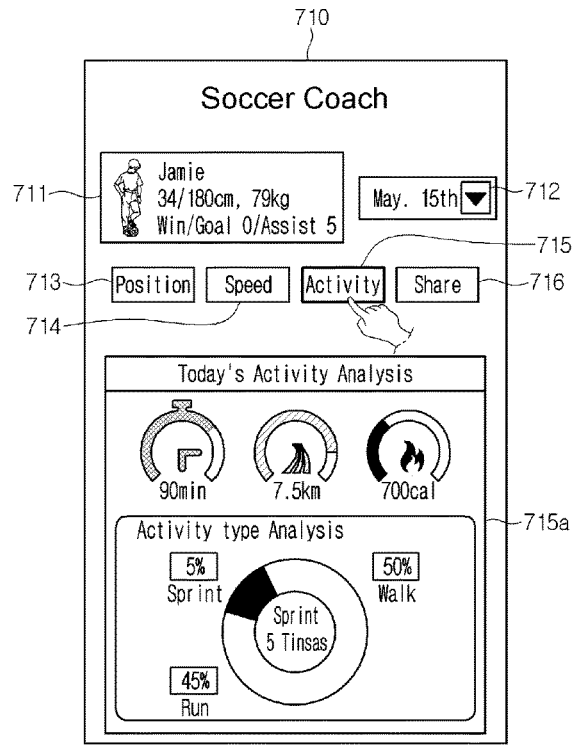
[Fig. 28]
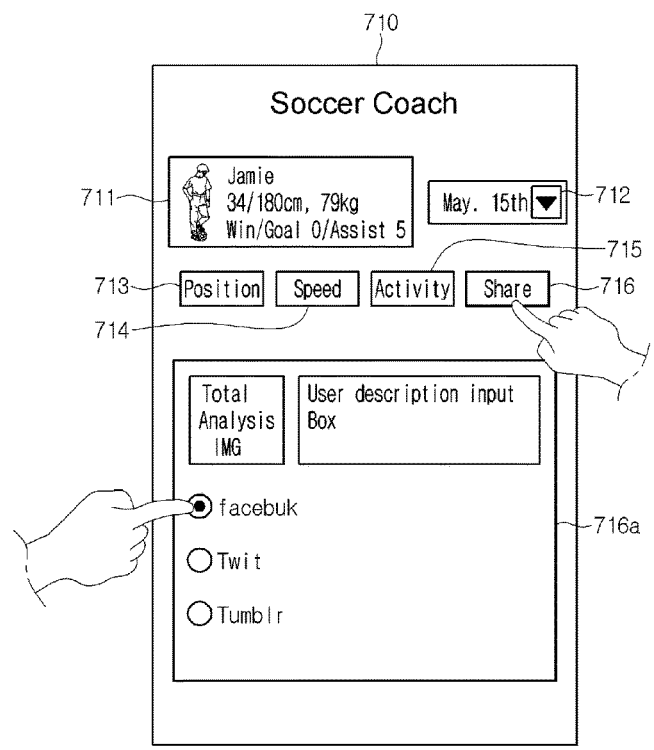

[Fig. 31]
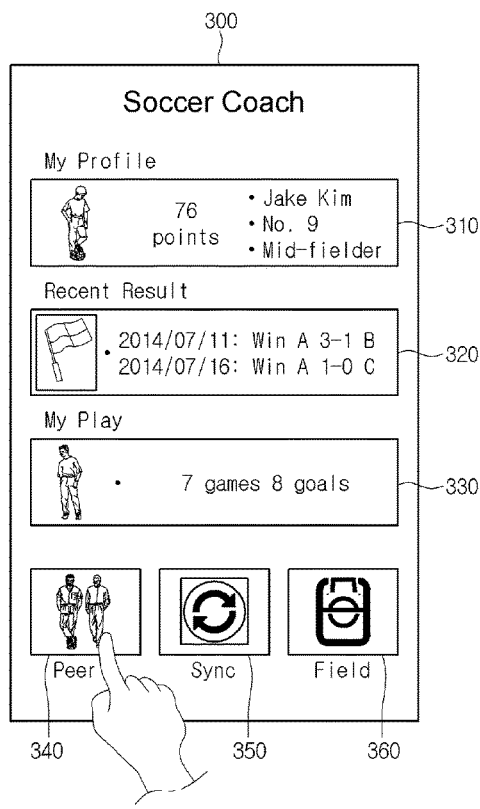
[Fig. 32]
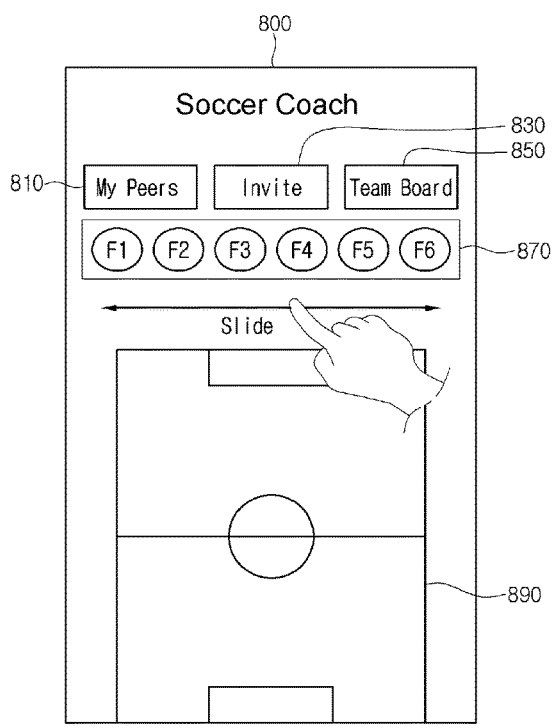

[Fig. 33]
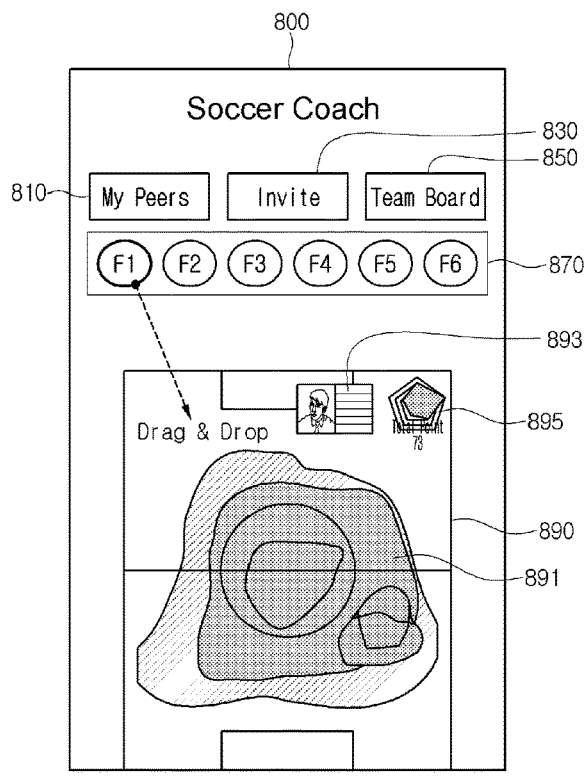
[Fig. 34]
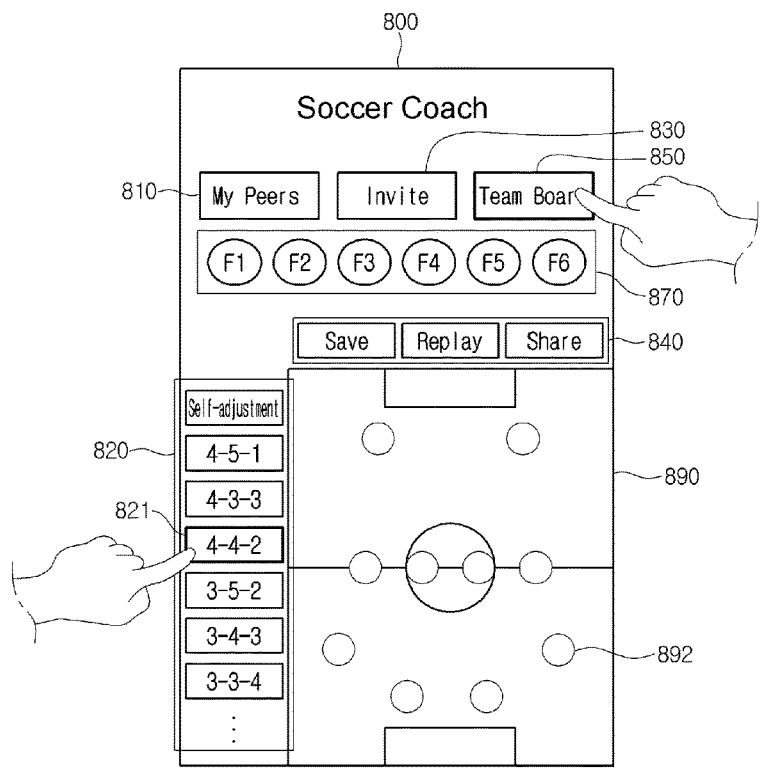

[Fig. 35]
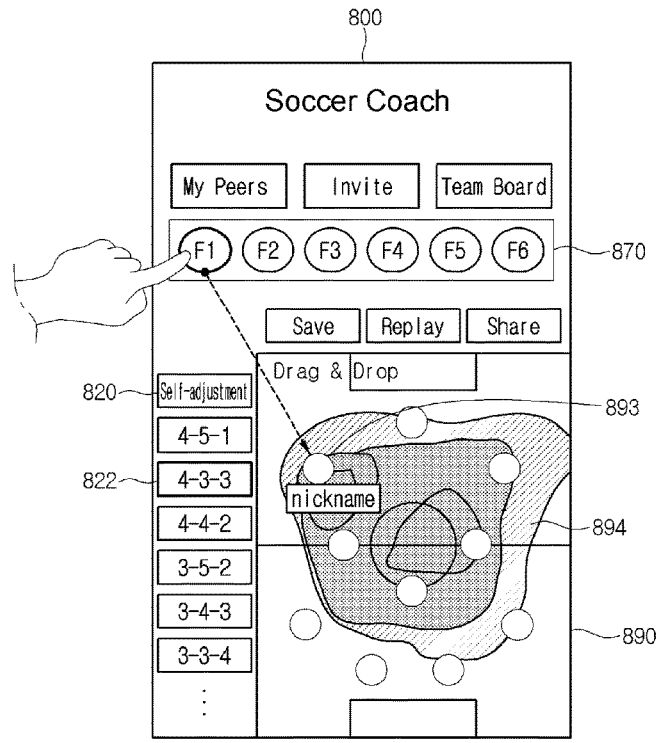
[Fig. 36]
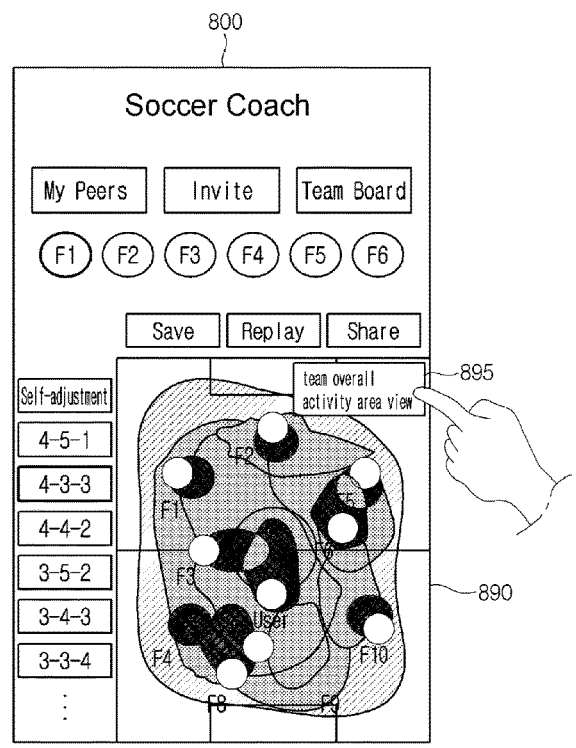

[Fig. 37]
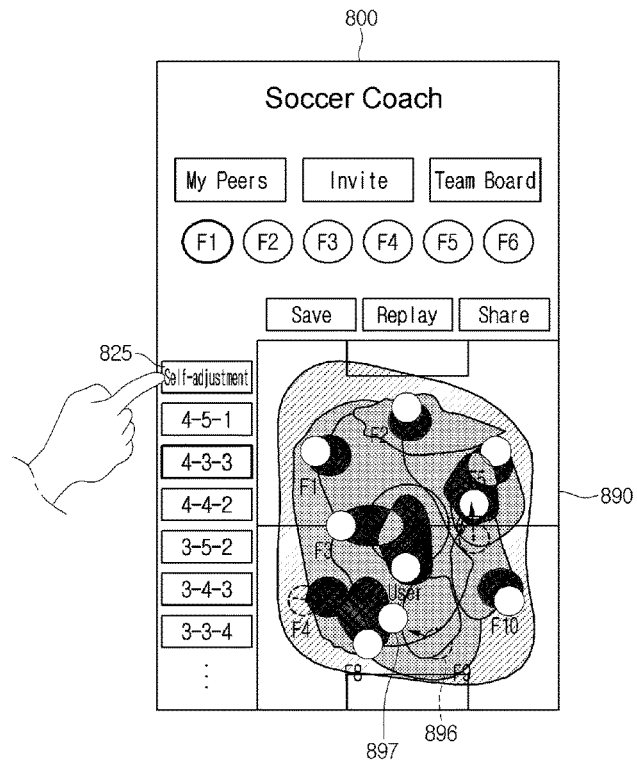
[Fig. 38]
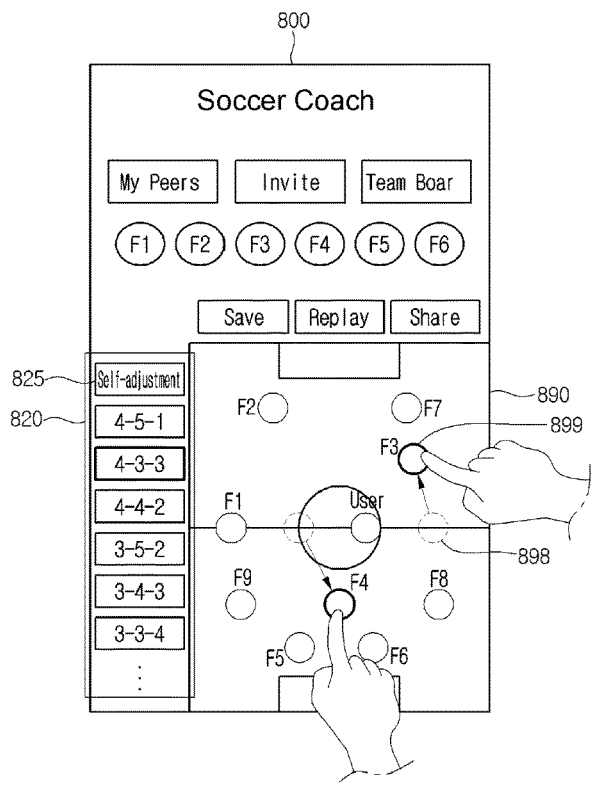

[Fig. 39]
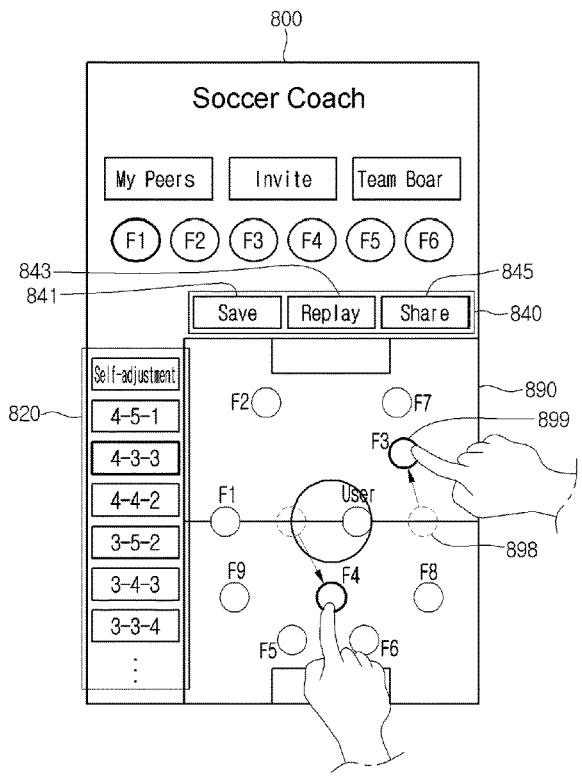
[Fig. 40]
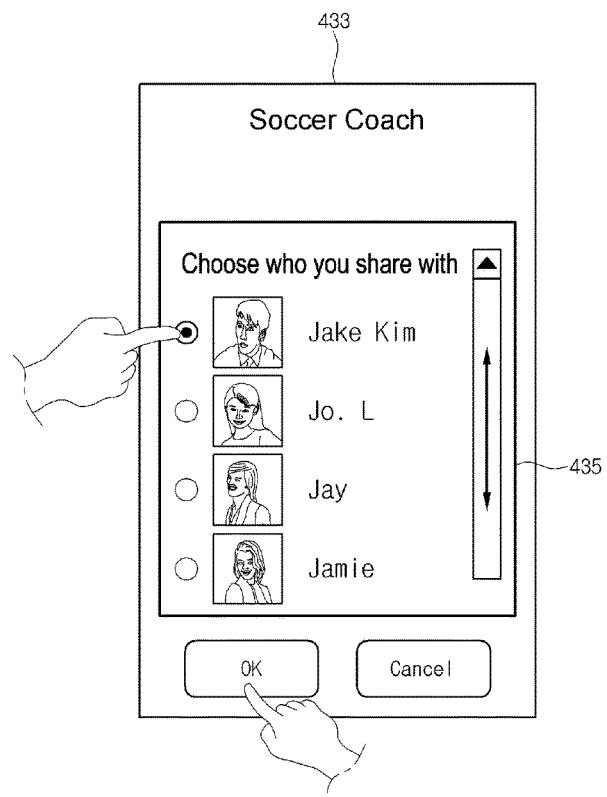

[Fig. 41]
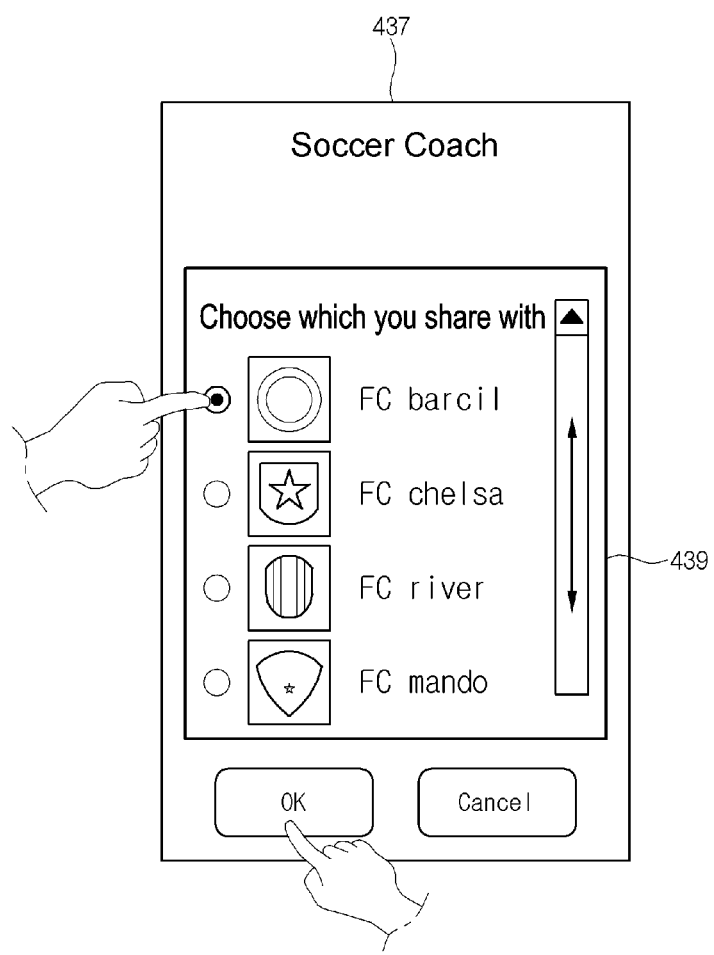

MOBILE TERMINAL AND AN OPERATING METHOD THEREOF

CROSS REFERENCE TO RELATED APPLICATIONS

This application is the National Phase of PCT International Application No. PCT/KR2014/008283, filed on Sep. 3, 2014, which claims priority under 35 U.S.C. 119(a) to Patent Application No. 10-2014-0091568, filed in Republic of Korea on Jul. 21, 2014, and to Patent Application No. 10-2014-0092690, filed in Republic of Korea on. Jul. 22, 2014, all of which are hereby expressly incorporated by reference into the present application.

TECHNICAL FIELD

The present disclosure relates to a mobile terminal and an operating method thereof.

BACKGROUND ART

Terminals may be divided into mobile/portable terminals or stationary terminals according to whether to be portable. The mobile terminals may be divided again into handheld terminals and vehicle mounted terminals whether to be directly portable.

Functions of a mobile terminal become diversified. For example, there are functions of data and voice communication, image and video capturing through a camera, voice recording, music file playback through a speaker system, and outputting an image or a video on a display unit. Some of terminals have an additional electronic game play function or perform a multimedia player function. In particular, mobile terminals nowadays may receive a broadcasting signal or a multicast signal providing visual content such as a video or a television program.

According to diversification of functions, such a terminal is implemented in a multimedia player type having complex functions therein, for example, image or video capturing, playback of a music or video file, a game, and broadcast reception.

In order to support or enhance such functions of the terminal, improving a structural part and/or software part of the terminal may be considered.

Recently, methods of obtaining information on a sports game in which the user plays through a mobile terminal have been proposed.

However, the user only passively uses the information on the sports game.

DISCLOSURE OF INVENTION

Technical Problem

Embodiments provide a mobile terminal and an operation method thereof for providing a game result to a user on the basis of user information obtained from a wearable device or allowing a user to provide various pieces of game information including setting a team strategy.

Embodiments also provide a mobile terminal and an operation method thereof for allowing a user to easily share a game result or information on a team strategy with a sharing partner.

Solution to Problem

In one embodiment, an operation method of a mobile terminal, includes: executing a sport application; obtaining at least one of exercise information and location information on a user from a wearable device; and providing a game result or setting a team strategy of a game that the user performs on the basis of the obtained at least one of exercise information and location information.

In another embodiment, a mobile terminal includes: a display unit providing a user interface screen; a user input unit obtaining a user input; a wireless communication unit obtaining at least one of exercise information and location information on a user from a wearable device; and a control unit providing a result of a game performed by the user and setting a team strategy on the basis of the obtained at least one of exercise information and location information.

The details of one or more embodiments are set forth in the accompanying drawings and the description below. Other features will be apparent from the description and drawings, and from the claims.

Advantageous Effects of Invention

According to various embodiments, various pieces of game information including a game result or team strategy setting can be provided to a user on the basis of user information obtained from a wearable device.

In addition, information on the game result or the team strategy can be easily shared with a sharing partner.

BRIEF DESCRIPTION OF DRAWINGS

FIG. 1 is a block diagram for explaining a mobile terminal in relation to an embodiment.

FIG. 2 is a flowchart for explaining an operation method of a mobile terminal according to an embodiment.

FIG. 3 is a view for explaining an initial user interface screen of a sports application according to an embodiment.

FIG. 4 illustrates an exemplary field setting screen according to an embodiment.

FIGS. 5 and 6 illustrate user interface screens provided according to receive sensitivity of a satellite signal according to embodiments.

FIGS. 7 to 10 illustrate user interface screens provided to set a new field according to embodiments.

FIGS. 11 and 12 illustrate user interface screens for using a pre-registered field list.

FIGS. 13 to 15 illustrate user interface screens for sharing information on a field with a sharing partner according to embodiments.

FIG. 16 is a view for explaining a terminal system according to an embodiment.

FIG. 17 is a block diagram of a wearable device according to an embodiment.

FIG. 18 is a flowchart for explaining an operation method of a mobile terminal according to another embodiment.

FIG. 19 is a view for explaining an initial user interface screen of a sports application according to an embodiment.

FIGS. 20 and 21 are view for providing a game result by performing synchronization according to embodiments.

FIGS. 22 to 25 illustrate user interface screens providing activity results of a user according to various embodiments.

FIG. 26 is a view for explaining a user interface screen for providing speed information on user according to an embodiment.

FIG. 27 is a view for explaining a user interface screen for providing activity amount information on a user according to an embodiment.

FIGS. 28 to 30 illustrate user interface screens for explaining examples of sharing a game result of a user with a sharing partner according to embodiments.

FIGS. 31 to 41 illustrate examples of a screen provided when a team strategy area is selected from an initial user interface screen according to embodiments.

BEST MODE FOR CARRYING OUT THE INVENTION

Figure 29:
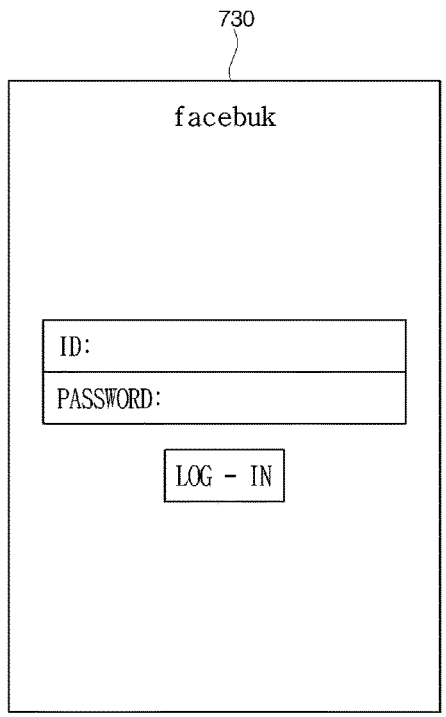

Reference will now be made in detail to the embodiments of the present disclosure, examples of which are illustrated in the accompanying drawings, in which like numbers refer to like elements throughout, and a repetitive explanation will be omitted. In the following description, usage of suffixes such as 'module', 'part' or 'unit' used for referring to elements is given merely to facilitate explanation of the present invention, without having any significant meaning by itself. In the following description, detailed descriptions of well-known functions or constructions will be omitted since they would obscure the invention in unnecessary detail. In addition, the accompanying drawings are used to help easily understand the technical idea of the present invention and it should be understood that the idea of the present invention is not limited by the accompanying drawings. However, this invention should not be construed as limited to specific disclosure forms, and the spirit and scope of the invention should be understood as incorporating various modifications, equivalents and substitutions.

It will be understood that, although the terms first, second, etc., may be used herein to distinguish one element from another element, not to be limited by the terms.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present.

As used herein, the singular forms "a," "an" and "the" are intended to include the plural forms as well, unless the context clearly indicates otherwise.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

A mobile terminal described herein may include a mobile phone, a smart phone, a laptop computer, a digital broadcast terminal, a personal digital assistants (PDA), a portable multimedia player (PMP), a navigator, a slate PC, a tablet PC, an ultrabook, a wearable device (for example, a smart watch, a smart glass, or a head mounted display (HMD)).

However, those skilled in the art may easily understand that a configuration according to embodiments described herein may also be applied a stationary terminal such as a digital TV, a desktop computer, or a digital signage, except a case of being applied only to a mobile terminal.

FIG. 1 is a block diagram for explaining a mobile terminal in relation to an embodiment.

The mobile terminal 100 may include a wireless communication unit 110, an input unit 120, a sensing unit 140, an output unit 150, an interface unit 160, a memory unit 170, a control unit 180, and a power supply unit 190. Since the elements illustrated in FIG. 1 are not essential for realizing a mobile terminal, a mobile terminal to be described herein may include more or fewer elements than the above-described.

In detail, the wireless communication unit 110 among the elements may include one or more modules enabling wireless communication between the mobile terminal 100 and another mobile terminal 100, or between the mobile terminal 100 and an external server. In addition, the wireless communication 110 may include one or more modules connecting the mobile terminal 100 to one or more networks.

The wireless communication unit 110 may include at least one of a broadcast reception module 111, a mobile communication module 112, a wireless internet module 113, a short range communication module 114, and a location information module 115.

The input unit 130 may include a camera 121 or an image input unit for an image signal input, a microphone 122 or an audio input unit for an audio signal input, a user input unit 123 (e.g., a touch key, a mechanical key, etc.) for receiving information from a user. Voice data or image data collected by the input unit 120 may be analyzed and processed with user's control commands.

The sensing unit 140 may include at least one sensor for sensing at least one of surrounding environment information around the mobile terminal and user information. For example, the sensing unit 140 may include at least one selected from a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (e.g., the camera (see 121)), a microphone (see 122), a battery gauge, an environmental sensor (e.g., a barometer, a hygrometer, a thermometer, a radiation sensor, a thermal sensor, a gas detection sensor, etc.), a chemical sensor (e.g., an e-nose, a healthcare sensor, a biometric sensor, etc.). Furthermore, the mobile terminal disclosed herein may combine and use information sensed by at least two sensors among those sensors.

The output unit 150 is for generating an output related to sense of sight, sense of hearing, or sense of touch, and may include at least one selected from a display unit 151, an audio output unit 152, a haptic module 153, and a light output unit 154. The display unit 151 may form a mutually layered structure with or be formed into one with a touch sensor, and realize a touch screen. Such a touch screen may not only function as the user input unit 123 providing an input interface between the mobile terminal 100 and the user, but also provide an output interface between the mobile terminal 100 and the user.

The interface unit 160 plays a role of a passage with various kinds of external devices connected to the mobile terminal 100. This interface unit 160 may include at least one selected from a wired/wireless headset port, an external charger port, a wired/wireless data port, a memory card port, a port connecting a device having an identification module prepared therein, an audio input/output (I/O) port, a video input/output (I/O) port, and an earphone port. In the mobile terminal 100, a proper control may be performed on a connected external device in correspondence to connection between the external device and the interface unit 160.

In addition, the memory 170 stores data for supporting various functions of the mobile terminal 100. The memory 170 may store a plurality of application programs or applications driven in the mobile terminal 100, data for operations of the mobile terminal 100, and instructions. At least a part of these application programs may exist in the mobile terminal 100 at the time of release for basic functions (e.g., a call originating or receiving function, a message transmitting and receiving function). Moreover, the application programs are stored in the memory 170 and installed in the mobile terminal 100, and then may be driven to perform operations (or functions) of the mobile terminal by the control unit 180.

The control unit 180 typically controls overall operations of the mobile terminal 100 besides operations related to the application programs. The control unit 180 may provide the user with, or process proper information or functions by processing a signal, data, or information input or output through the above-described elements, or driving the application programs stored in the memory 170.

In addition, the control unit 180 may control at least a part of the elements illustrated in FIG. 1 so as to drive the application programs stored in the memory 170. Furthermore, the control unit 180 may combine at least two elements among the elements included in the mobile terminal 100 and operate the combined.

The power supply unit 190 receives internal or external power under a control of the control unit 180 and supplies the power to each element included in the mobile terminal 100. The power supply unit 190 includes a battery and the battery may be an embedded type battery or a replaceable battery.

At least a part of the elements may operate in cooperation with each other for realizing an operation, control, or control method of the mobile terminal according to various embodiments. In addition, the operation, control, or control method of the mobile terminal may be realized in the mobile terminal by driving at least one application program stored in the memory 170.

Hereinafter, the above-described elements are described in detail with reference to FIG. 1 before describing various embodiments realized through the mobile terminal 100.

Firstly, in the wireless communication unit 110, the broadcast reception module 111 receives a broadcast signal and/or broadcast related information from an external broadcast management server through a broadcast channel. The broadcast channel may include a satellite channel or a terrestrial channel. Two or more broadcast reception modules may be provided to the mobile terminal 100 for simultaneous broadcast reception or broadcast channel switching for at least two broadcast channels.

The mobile communication module 112 may transmit and receive wireless signals to and from at least one selected from a base station, an external terminal, and a server on a mobile communication network constructed according to technical standards or communication schemes for the mobile communication (e.g., Global System for Mobile communication (GSM), Code Division Multi Access (CDMA), Code Division Multi Access 2000 (CDMA 2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), and Long Term Evolution-Advanced (LTE-A) etc.).

The wireless signal may include a voice call signal, a video call signal, or various types of data according to transmission and reception of a text/multimedia message.

The wireless internet module 113 refers to a module for a wireless internet connection, and may be embedded in or prepared outside the mobile terminal 100. The wireless internet module 113 is configured to transmit and receive a wireless signal over a communication network conforming with wireless internet technologies.

The wireless internet technologies include, for example, Wireless LAN (WLAN), Wireless-Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and LTE-Advanced (LTE-A), and the wireless internet module 113 transmits and receives data according to at least one wireless internet technology within the range of including internet technology not described in the above.

From a viewpoint that an access to the wireless internet through WiBro, HSDPA, HSUPA, GSM, CDMA, WCDMA, LTE, or LTE-A is conducted through a mobile communication network, the wireless internet module 113 conducting the access to the wireless internet through the mobile communication network may be understood as a kind of the mobile communication module 112.

The short range communication module 114 is for short range communication and may support the short range communication by using at least one selected from Bluetooth™, Radio Frequency Identification (RFID), Infrared Data Association (IrDA), Ultra Wideband UWB), ZigBee, Near Field Communication (NFC), Wi-Fi, Wi-Fi Direct, and Wireless Universal Serial Bus (Wireless USB) technologies. This short range communication module 114 may support, through a wireless area network, wireless communication between the mobile communication terminal 100 and a wireless communication system, between the mobile terminal 100 and another mobile terminal 100, or between the mobile terminal 100 and a network on which the other mobile terminal 100 or an external server is located. The wireless area network may be a wireless personal area network.

Here, the other mobile terminal 100 may be a wearable device (e.g., a smart watch, a smart glass, or an HMD) through which data is mutually exchangeable (or interworkable) with the mobile terminal 100 according to an embodiment. The short range communication module 114 may detect (or recognize) a wearable device capable of communicating with the mobile terminal 100. Furthermore, when the detected wearable device is authenticated to communicate with the mobile terminal 100, the control unit 180 may transmit at least a part of data processed in the mobile terminal 100 to the wearable device through the short range communication module 114. Therefore, a user of the wearable device may use the data processed by the mobile terminal 100 through the wearable device. For example, when a call is received by the mobile terminal 100, the user may perform a phone call through the wearable device, or when a message is received by the mobile terminal 100, the user may check the received message through the wearable device.

The location information module 115 is for obtaining a location (or a current location) of the mobile terminal. As a representative example thereof, there is a global positioning system (GPS) module or a Wi-Fi module. For example, when adopting the GPS module, the mobile terminal may obtain a location of the mobile terminal by using a signal transmitted from a GPS satellite. For another example, when adopting the Wi-Fi module, the mobile terminal may obtain the location of the mobile terminal on the basis of information on a wireless access point (AP) transmitting or receiving a wireless signal with the Wi-Fi module. If necessary, the location information module 115 may additionally or alternatively perform any one function among other modules in the wireless communication unit 110 in order to obtain data about the location of the mobile terminal. The location information module 115 is a module used for obtaining the location (or current location) of the mobile terminal, and is not limited to a module directly calculating or obtaining the location of the mobile terminal.

Next, the input unit 120 is for receiving image information (or an image signal), audio information (or an audio signal), data, or information input from the user. The mobile terminal 100 may include one or a plurality of cameras 121 for an input of image information. The camera 121 processes an image frame such as a still image or video obtained by an image sensor in a video call mode or an image capturing mode. The processed image frame may be displayed on the display unit 151 or stored in the memory 170. Furthermore, the plurality of cameras 121 prepared in the mobile terminal 100 may be arranged to form a matrix structure, and, through the cameras 121 forming this matrix structure, a plurality of pieces of information on images having different angles or different focuses may be input to the mobile terminal 100. In addition, the plurality of cameras 121 may be arranged in a stereo structure to obtain left and right images for realizing a stereoscopic image.

The microphone 122 may process an external sound signal as electrical voice data. The processed voice data may be variously used according to a function (or an application program) being performed in the mobile terminal 100. Furthermore, various noise removal algorithms may be implemented for removing noise generated in a process for receiving the external sound signal.

The user input unit 123 is for receiving information from the user. When information is input through the user input unit 123, the control unit 180 may control an operation of the mobile terminal 100 in correspondence to the input information. This user input unit 123 may include a mechanical input unit (or mechanical key, for example, buttons positioned on the front and rear surfaces or on the side surfaces, a dome switch, a jog wheel, or a jog switch, etc.) and a touch type input unit. As an example, the touch type input unit may be configured with a virtual key displayed on a touch screen through a software processing, a soft key, or a visual key, or a touch key disposed on a portion other than the touch screen. In addition, the virtual key or the visual key is possibly displayed on the touch screen in various types and, for example, may be configured with graphics, texts, icons, videos, or a combination thereof.

Furthermore, the sensing unit 140 may sense at least one of environmental information surrounding the mobile terminal 100 and user information, and generate a sensing signal corresponding to the sensed information. The control unit 180 may control driving or operations of the mobile terminal 100, or perform data processing, a function, or an operation related to an application program installed in the mobile terminal 100, on the basis of the sensing signal. Hereinafter, representative sensors among various sensors that may be included in the sensing unit 140 are described in detail.

Firstly, the proximity sensor 141 refers to a sensor detecting presence of an object accessing or around a predetermined detecting surface by using an electromagnetic force or an infrared ray without a mechanical contact. This proximity sensor 141 may be disposed in an internal area of the mobile terminal surrounded by the above-described touch screen or around the touch screen.

As an example of the proximity sensor 141, there is a transmissive optoelectronic sensor, a diffuse optoelectronic sensor, a high frequency oscillating proximity sensor, a capacitive proximity sensor, an inductive proximity sensor, or an infrared proximity sensor. When the touch screen is capacitive type, the proximity sensor 141 may be configured to detect an access of an object having conductivity by a change of an electric field according to the access of the object. In this case, the touch screen (or a touch sensor) itself may be classified into a proximity sensor.

Moreover, for convenience of explanation, a behavior that an object is in proximity to the touch screen without contacting the touch screen and is allowed to be recognized as if the object is on the touch screen is referred to as a "proximity touch". A behavior that an object actually contacts the touch screen is referred to as a "contact touch". A position at which an object is subject to a proximity touch over the touch screen means a position at which the object vertically corresponds to the touch screen when the object is subject to the proximity touch. The proximity sensor 141 may detect a proximity touch and a proximity touch pattern (e.g., a proximity touch distance, a proximity touch direction, a proximity touch speed, a proximity touch time, a proximity touch position, a proximity touch shift state, etc.). Furthermore, the control unit 180 may process data (or information) corresponding to a proximity touch action and the proximity touch pattern detected through the proximity sensor 141 and, in addition, may output visual information corresponding to the processed data on the touch screen. In addition, the control unit 180 may control the mobile terminal 100 so that different operations or different data (or information) are processed according to whether a touch for an identical point on the touch screen is a proximity touch or a contact touch.

The touch sensor senses a touch (or a touch input) applied to the touch screen (or the display unit 151) by using at least one of various touch schemes including a resistive-film scheme, a capacitive scheme, an infrared ray scheme, an ultrasonic scheme, and a magnetic field scheme.

As an example, the touch sensor may be configured to convert a change in pressure applied to a specific part or a change in capacitance generated at a specific part of the touch screen into an electrical input signal. The touch sensor may be configured to detect a position or an area thereon which is touched by a touch object touching the touch screen, or pressure or capacitance at the time of the touch. Here, the touch object may be an object applying a touch on the touch sensor, for example, a finger, a touch pen, a stylus pen, or a pointer.

In this way, when there is a touch input on the touch sensor, a signal (signals) corresponding thereto is (are) transmitted to a touch controller. The touch controller processes the signal(s) and transmits corresponding data to the control unit 180. Accordingly, the control unit 180 may know which area of the display unit 151 is touched. Here, the touch controller may be a separate element other than the control unit 180, or be the control unit itself.

Furthermore, the control unit 180 may perform different controls or an identical control according to a kind of the touch object, which touches the touch screen (or a touch key prepared other than the touch screen). Whether to perform different controls or an identical control according to a kind of the touch object may be determined according to a current operation state of the mobile terminal 100 or an application program being executed.

The above-described touch sensor and proximity sensor may sense independently or in a combined manner various types of touches on the touch screen, wherein the touches include a short (or a tap) touch, a long touch, a multi-touch, a drag touch, a flick touch, a pinch-in touch, a pinch-out, a swipe touch, and a hovering touch.

The ultrasonic sensor may recognize position information on a touch object by using an ultrasonic wave. The control unit 180 is able to calculate a position of a wave generating source through information sensed by an optical sensor and a plurality of ultrasonic sensors. The position of the wave generating source may be calculated by using a property that a light is very faster than the ultrasonic wave, in other words, a time that a light arrives at an optical sensor is very shorter than a time that an ultrasound wave arrives at an ultrasonic sensor. In detail, the position of the wave generating source may be calculated by using a time difference from a time when an ultrasonic wave arrives with a light considered as a reference signal.

Furthermore, from a view of a configuration of the input unit 120, the camera 121 includes at least one selected from a camera sensor (e.g., a CCD, or a CMOS sensor), a photo sensor (or an image sensor), and a laser sensor.

The camera 121 and the laser sensor may be combined together and sense a touch of the sensing target for a 3-dimensional stereoscopic image. The photo sensor may be stacked on a display element, and this photo sensor scans a movement of the sensing target close to the touch screen. In detail, the photo sensor includes photo diodes and transistors in rows/columns and scans a target mounted on the photo sensor by using an electrical signal changed according to an amount of a light applied to the photo diodes. In other words, the photo sensor performs coordinate calculation on the sensing target according to a change amount of the light and, through this, position information on the sensing target may be obtained.

The display unit 151 displays (outputs) information processed by the mobile terminal 100. For example, the display unit 151 may display execution screen information on the application program driven in the mobile terminal 100 or user interface (UI) information or graphic user interface (GUI) information according to the execution screen information.

In addition, the display unit 151 may be configured as a stereoscopic display unit displaying a stereoscopic image.

A 3-dimensional display scheme such as a stereoscopic scheme (glasses type), an autostereoscopic scheme (glassless type), or a projection scheme (a holographic scheme) may be applied to the stereoscopic display unit.

The sound output unit 152 may output audio data received from the wireless communication unit 110 or stored in the memory 170 in a call signal reception mode, a call mode or a recording mode, a speech recognition mode, or in a broadcast reception mode. The sound output unit 152 may output a sound signal related to a function (e.g., a call signal reception sound, or a message reception sound, etc.) performed in the mobile terminal 100. This sound output unit 152 may include a receiver, a speaker, or a buzzer, etc.

The haptic module 153 may generate various tactile effects that the user may feel. A representative example of the tactile effect that is generated by the haptic module 153 may be vibration. Strength and a pattern of the vibration generated by the haptic module 153 may be controlled by user selection or setting by the control unit. For example, the haptic module 153 may output different vibrations sequentially or by synthesizing them.

Besides the vibration, the haptic module 153 may generate various tactile effects including an effect by a stimulus such as a pin array moving vertically to a contact skin surface, a air discharge force or air absorptive power through an outlet or an inlet, brush against a skin surface, contact to an electrode, or static electricity, and an effect by reproducing a cold and warmth sense by using a device that heat absorption or heating is enabled.

The haptic module 153 may be implemented to transfer the tactile effect through a direct contact, and may also be implemented for the user to feel the tactile effect through a muscle sense of a finger or an arm. The haptic module 153 may be prepared two or more in number according to a configuration aspect of the mobile terminal 100.

The optical output unit 154 may output a signal for notifying an event occurrence by using a light from an optical source of the mobile terminal 100. The event occurred in the mobile terminal 100 may be exemplified with message reception, call signal reception, missed calls, alarm, schedule notification, email reception, or information reception through an application.

The signal output by the optical output unit 154 is implemented according to that the mobile terminal emits a monochromatic light or a multi-chromatic light towards the front or rear surface. The signal output may be completed when the mobile terminal detects that the user checks the event.

The interface unit 160 may play a role of a passage with all external devices connected to the mobile terminal 100. The interface unit 160 may receive data from the external device, receive power and transfer the power to each element inside the mobile terminal 100, or allow internal data of the mobile terminal 100 to be transmitted to the external device. For example, the interface 160 may include a wired/wireless headset port, an external charger port, a wired/wireless data port, a memory card port, a port connecting a device that an identification module is prepared, an audio input/output (I/O) port, a video input/output (I/O) port, or an earphone port, etc.

Furthermore, the identification module is a chip storing various pieces of information for authenticating user's authority for the mobile terminal 100 and may include a user identify module (UIM), a subscriber identity module (SIM), or a universal subscriber identity module (USIM). A device including the identification module (hereinafter, an 'identification device') may be manufactured in a smart card type. Accordingly, the identification device may be connected to the mobile terminal 100 through the interface unit 160.

In addition, when the mobile terminal 100 is connected to an external cradle, the interface unit 160 may be a passage through which power is supplied from the cradle to the mobile terminal 100 or a passage through which various command signals input from the cradle by the user are delivered. The various command signals or the power input from the cradle may operate as signals for perceiving that the mobile terminal 100 is accurately mounted in the cradle.

The memory 170 may store a program for operations of the control unit 180 and temporarily store input/output data (e.g., a phone book, messages, still images, videos, etc.). The memory 170 may store data about vibrations of various patterns and sounds at the time of a touch input on the touch screen.

The memory 170 may include at least one storage medium type among a flash memory type, a hard disk type, a Solid State Disk (SSD) type, a Silicon Disk Drive (SDD) type, a multimedia card micro type, a card type memory (e.g., SD or XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk and an optical disc. The mobile terminal 100 may operate in relation to a web storage performing a storage function of the memory 170 over the internet.

Furthermore, as described above, the controller 180 normally controls overall operations and an operation related to an application program of the mobile terminal 100. For example, when a state of the mobile terminal satisfies a set condition, the control unit 180 executes or releases a lock state that limits an input of a user's control command to applications.

In addition, the control unit 180 may perform a control or a process related to a voice call, data communication, or a video call, etc., or may perform a pattern recognition processing for recognizing a written input and a drawing input performed on the touch screen as a character and an image, respectively. Furthermore, the control 180 may combine and control any one of or a plurality of the above-described elements in order to implement various embodiments to be described below in the mobile terminal 100.

The power supply unit 190 receives external or internal power under a control of the control unit 180 and supplies power necessary for operating each element. The power supply unit 190 includes a battery. The battery may be an embedded battery that is rechargeable and may be detachably coupled for charging.

The power supply unit 190 may include a connection port, and the connection port may be configured as an example of the interface 160 to which an external charger providing power is electrically connected for charging the battery.

As another example, the power supply unit 190 may be configured to charge the battery in a wireless manner without using the connection port. In this case, the power supply unit 190 may receive, from an external wireless power transmitting device, power by using one or more of an inductive coupling manner on the basis of a magnetic induction phenomenon and a magnetic resonance coupling manner on the basis of an electromagnetic resonance phenomenon.

Hereinafter, various embodiments may be implemented in a recording medium that is readable with a computer or a similar device by using software, hardware, or a combination thereof.

Next, description is made about a communication system realizable through the mobile terminal 100 according to an embodiment.

Firstly, the communication system may use different wireless interfaces and/or a physical layer. For example, the wireless interface available by the communication system may include Frequency Division Multiple Access (FDMA), Time Division Multiple Access (TDMA), Code Division Multiple Access (CDMA), Universal Mobile Telecommunications Systems (UMTS)(in particular, Long Term Evolution (LTE), or Long Term Evolution-Advanced (LTE-A)), Global System for Mobile Communications (GSM), or etc.

Hereinafter, for convenience of explanation, description is made limitedly to CDMA. However, it is obvious that the embodiments may be applied to all communication systems including an Orthogonal Frequency Division Multiplexing (OFDM) wireless communication system as well as a CDMA wireless communication system.

The CDMA wireless communication system may include at least one terminal 100, at least one base station (BS, also may be referred to as Node B or Evolved Node B), at least one BS controller (BSC) and a mobile switching center (MSC). The MSC may be configured to be connected to the Public Switched Telephone Network (PSTN) and BSCs. The BSCs may be connected to the BS in pair through a backhaul line. The backhaul line may be prepared according to at least one selected from E1/T1, ATM, IP, PPP, Frame Relay, HDSL, ADSL, and xDSL. Accordingly, the plurality of BSCs may be included in a CDMA wireless communication system.

Each of a plurality of BSs may include at least one sector, and each sector may include an omni-directional antenna or an antenna indicating a specific radial direction from the BS. In addition, each sector may include two or more antennas having various types. Each BS may be configured to support a plurality of frequency allocations and each of the plurality of allocated frequencies may have specific spectrum (e.g., 1.25 MHz, or 5 MHz).

An intersection between the sector and the frequency allocation may be called as a CDMA channel. The BS may be called as a base station transceiver subsystem (BTSs). In this case, one BSC and at least one BS are called together as a "base station". The base station may also represent a "cell site". In addition, each of a plurality of sectors for a specific BS may also be called as a plurality of cell sites.

A broadcasting transmitter (BT) transmits a broadcast signal to terminals 100 operated in a system. The broadcast reception module 111 illustrated in FIG. 1 is prepared in the terminal 100 for receiving the broadcast signal transmitted by the BT.

Furthermore, in the CDMA wireless communication system, a global positioning system (GPS) may be linked for checking a location of the mobile terminal 100. A satellite is helpful for grasping the location of the mobile terminal. Useful location information may be obtained by less than two or at least two satellites. Here, the location of the mobile terminal 100 may be tracked by using all techniques, which are capable of tracking the location, as well as a GPS tracking technique. In addition, at least one of GPS satellites may be selectively or additionally responsible for transmitting satellite digital multimedia broadcasting (DMB).

The location information module 115 prepared in the mobile terminal 100 is for detecting, operating or identifying the location of the mobile terminal 100, and may representatively include a GPS module and a WiFi module. If necessary, the location information module 115 may alternatively or additionally perform any function of other modules in the wireless communication unit 110 for obtaining data for the location of the mobile terminal 100.

The GPS module 115 may precisely calculate 3D current location information according to latitude, longitude, and altitude by calculating distance information from three or more satellites and precise time information, and by applying a trigonometry to the calculated information. A method is currently widely used that calculates location and time information using three satellites, and corrects an error in the calculated location and time information using another satellite. The GPS module 115 may calculate speed information by continuously calculating a current location in real time. However, it is difficult to precisely measure the location of the mobile terminal 100 by using the GPS module in a dead zone, such as an indoor area, of the satellite signal. Accordingly, in order to compensate for location measurement in the GPS manner, a WiFi positioning system (WPS) may be used.

The WPS is a technique for tracking the location of the mobile terminal 100 using a WiFi module prepared in the mobile terminal 100 and a wireless access point (AP) transmitting or receiving a wireless signal to or from the WiFi module, and may mean a location measurement technique based on a wireless local area network (WLAN) using WiFi.

The WPS may include a WiFi positioning server, the mobile terminal 100, a wireless AP connected to the mobile terminal 100, and a database storing arbitrary wireless AP information.

The mobile terminal 100 connected to the wireless AP may transmit a location information request message to the WiFi positioning server.

The WiFi positioning server extracts information on the wireless AP connected to the mobile terminal 100 on the basis of the location information request message (or a signal) of the mobile terminal 100. The information on the wireless AP connected to the mobile terminal 100 may be transmitted to the WiFi positioning server through the mobile terminal 100 or transmitted to the WiFi positioning server from the wireless AP.

The information on the wireless AP, which is extracted on the basis of the location information request message of the mobile terminal 100, may be at least one selected from a MAC address, a Service Set Identification (SSID), a Received Signal Strength Indicator (RSSI), Reference Signal Received Power (RSRP), Reference Signal Received Quality (RSRQ), channel information, Privacy, a Network Type, Signal Strength, and Noise Strength.

As described above, the WiFi positioning server may receive information on the wireless AP connected to the mobile terminal 100, and extract wireless AP information corresponding to the wireless AP to which the mobile terminal is being connected from the pre-constructed database. At this point, information on arbitrary wireless APs, which is stored in the database, may be information on a MAC Address, an SSID, channel information, Privacy, a Network Type, latitudinal and longitudinal coordinates of a wireless AP, a building name and floor on which the wireless AP is located, indoor detailed location information (GPS coordinates available), an address of an owner of the wireless AP, a phone number, and etc. At this point, in order to remove a wireless AP provided by using a mobile AP or an illegal MAC address in the location measurement process, the WiFi positioning server may extract a predetermined number of pieces of wireless AP information in the descending order of an RSSI.

Thereafter, the WiFi positioning server may extract (or analyze) location information on the mobile terminal 100 by using at least one piece of wireless AP information extracted from the database. The location information of the mobile terminal 100 is extracted (or analyzed) by comparing the stored and the received wireless AP information.

As a method of extracting (or analyzing) location information on the mobile terminal 100, a cell-ID method, a fingerprint method, a trigonometry, and a landmark method may be used.

The cell-ID method is a method of determining a location of a wireless AP having strongest strength from among surrounding wireless AP information collected by a mobile terminal. This method is advantageous in that implementation is simple, an additional cost is not necessary, and location information may be rapidly obtained. However, when installation intensity of a wireless AP is lower, positioning precision becomes lowered.

The fingerprint method is a method of selecting a reference location in a service area, collecting signal strength information, and estimating a location through signal strength information transmitted from a mobile terminal on the basis of the collected information. In order to use the fingerprint method, it is necessary to construct a database for propagation characteristics in advance.

The trigonometry is a method of operating a location of a mobile terminal on the basis of a distance between coordinates of at least three wireless APs and the mobile terminal. For estimating the distances between the mobile terminal and the wireless APs, signal strength is converted into distance information, or a time of arrival (ToA) of a wireless signal, a time difference of arrival (TDoA) of a wireless signal, an angle of arrival (AoA) of a wireless signal may be used.

The landmark method is a method of measuring a location of a mobile terminal by using a landmark transmitter.

Besides the above-described methods, various algorithms may be used for extracting (or analyzing) location information on a mobile terminal.

The location information on the mobile terminal 100 extracted in this way may be transmitted to the mobile terminal 100 through the WiFi positioning server and the mobile terminal 100 may obtain the location information.

The mobile terminal 100 may obtain location information by being connected to at least one wireless AP. At this point, the number of wireless APs requested for obtaining the location information on the mobile terminal 100 may be variously varied according to a wireless communication environment in which the mobile terminal 100 is located.

Hereinafter, description is provided about an operation method of a mobile terminal according to an embodiment with reference to FIGS. 2 to 15.

FIG. 2 is a flowchart for explaining an operation method of a mobile terminal according to an embodiment.

The control unit 180 of the mobile terminal 100 executes a sports application (operation S101). The sports application may be an application that a user sets information on a sports game and a sports game result is provided to the user. The sports game may be, but is not limited to, any one of soccer, baseball, basketball, tennis, and ice hockey, and may include all sports games.

Hereinafter, the sports game is assumed as a soccer game and description thereabout is made.

The control unit 180 of the mobile terminal 100 provides an initial user interface screen of the sports application through the display unit 151 according to execution of the sports application (operation S103).

The initial user interface screen is a screen for setting information on the sports game or for providing a result of a sports game performed by the user. Description is made about the initial user interface screen provided by execution of the sports application with reference to FIG. 3.

FIG. 3 is a view for explaining an initial user interface screen of a sports application according to an embodiment.

Referring to FIG. 3, an initial user interface screen 300 provided through the display unit 151 of the mobile terminal 100 may include a profile information area 310, a recent game result area 320, a game record area 330, a team strategy area 340, a synchronization area 350, and a field area 360.

The profile information area 310 is an area for providing profile information on a user of the mobile terminal 100. The profile information area 310 may include a profile image of the user, a user's score, a user's name, a user's back number, and a user's position.

The recent game result area 320 is an area for providing results of recent games of a team to which the user belongs. The recent game result area 320 may include a recent game date, victory or defeat of the recent game, and a recent game score.

The game record area 330 is an area for providing an accumulated game record of the user.

The team strategy area 340 is an area for providing information on other users. When the team strategy area 340 is selected, an opponent list may be provided. When a specific other user is selected on the opponent list, the mobile terminal 100 may provide information on the selected other user.

The synchronization area 350 is an area for updating information provided on the initial user interface screen 300. In other words, when the synchronization area 350 is selected, the mobile terminal 100 may receive information on the user from the wearable device 200 interlocked with the mobile terminal 100. The information on the user may include at least one of body information, exercise information, and location information on the user. The mobile terminal 100 may provide a result of a game that the user actually plays on the basis of the user information received from the wearable device 200. Description about this will be provided later.

The field area 360 is an area for setting a new field, providing information on a pre-registered field, or sharing information on the pre-registered field with other users.

Description is made with reference to FIG. 2 again.

The control unit 180 of the mobile terminal 100 may obtain a selection input for selecting the field area 360 included in the initial user interface screen through the user input unit 123 (operation S105).

In an embodiment, the selection input for selecting the field area 360 may be, but is not limited to, a touch input by the user.

The control unit 180 of the mobile terminal 100 provides a field setting screen through the display unit 151 according to selection input for selecting the obtained field area (operation S107).

On the field setting screen, information may be provided for registering a new field, providing a pre-registered field list, or sharing the pre-registered field list with other users. Regarding this is described with reference to FIG. 4.

FIG. 4 illustrates an exemplary field setting screen according to an embodiment.

When the field area 360 is selected on the initial user interface screen 300 illustrated in FIG. 3, the control unit 180 may provide the field setting screen 400 illustrated in FIG. 4.

The field setting screen 400 may include a new field tab 410, an existing field tab 420, and a share field tab 430.

The new field tab 410 may be a tab for registering a new field.

The existing field tab 420 may be a tab for providing a previously registered field list and detailed information on the existing fields, and setting the existing fields.

The share field tab 430 may be a tab for sharing information on the registered fields with sharing partners.

Description is made with reference to FIG. 2 again.

When the new field tab 410 is selected on the field setting screen 400, the control unit 180 of the mobile terminal 100 receives a satellite signal and checks receive sensitivity of the received satellite signal (operation S111). The location information module 115 of the mobile terminal 100 may receive the satellite signal from a GPS satellite and obtain the location (or a current location) of the mobile terminal 100 on the basis of the received satellite signal. The control unit 180 may measure receive sensitivity of the satellite signal obtained by the location information module 115 and set a new field on the basis of the receive sensitivity of the measured satellite signal.

When the receive sensitivity of the received satellite signal is not smaller than a reference sensitivity (operation S113), the control unit 180 obtains a setting input for setting a new field through the user input unit 123 (operation S115). In an embodiment, the reference sensitivity may be a threshold value for enabling to set the new field. When the receive sensitivity of the satellite signal is not smaller than the reference sensitivity, the user may set the new field. When the receive sensitivity is smaller than the reference sensitivity, the user may not set the new field.

The control unit 180 sets the new field according to the obtained setting input (operation S117).

Furthermore, when the receive sensitivity of the received satellite signal is smaller than the reference sensitivity (operation S113), the control unit 180 may provide a state for the receive sensitivity of the satellite signal through the display unit 151 (operation S119).

Description about operations S111 to S113 is provided with reference FIGS. 4 to 10.

Referring to FIG. 4, when the new field tab 410 is selected on the field setting screen 400, the mobile terminal 100 may provide a sensitivity test screen 401 for testing the receive sensitivity of the satellite signal.

Next, description is provided with reference to FIGS. 5 to 10.

FIGS. 5 and 6 are views for explaining the user interface screen provided according to the receive sensitivity of the satellite signal according to an embodiment, and FIGS. 7 to 10 illustrate user interface screens provided for setting a new field according to an embodiment.

When the receive sensitivity of the received satellite signal is not smaller than the reference sensitivity, the mobile terminal 100 may provide a popup window 411 for inputting a name of the new field as illustrated in FIG. 5. The user may input the name of the new field and perform thereafter setting processes.

Furthermore, when the receive sensitivity of the received satellite signal is smaller than the reference sensitivity, the mobile terminal 100 may provide, on the user interface screen 405, a popup window 412 representing that the receive sensitivity of the satellite signal is not good as illustrated in FIG. 6. For example, the popup window 412 may include a phrase inducing the user to retry, since the satellite signal is not received from the GPS satellite. When <Re-try> button is selected, the mobile terminal 100 performs a procedure of receiving again the satellite signal from the GPS satellite. When <Ignore> button is selected, the mobile terminal 100 completes the setting of the new field.

Next, description is made with reference to FIGS. 7 to 10.

When the receive sensitivity of the satellite signal is not smaller than the reference sensitivity and the name of the new field is input through the user interface screen 403 of FIG. 5, the mobile terminal 100 may provide a new field setting screen 407 through the display unit 151.

The new field setting screen 407 may be a screen for setting a shape of the field on the basis of a location of the mobile terminal 100 (or a location of the user holding the mobile terminal 100). For an example of setting the shape of a soccer field, a virtual soccer field 413 of a rectangular shape may be provided on the new field setting screen 407 and the virtual soccer field may include four virtual vertex areas 413a, 513b, 413c, and 413d. The four virtual vertex areas 413a, 513b, 413c, and 413d may respectively correspond to the four vertexes of an actual soccer field. Each of the four virtual vertex areas 413a, 413b, 413c, and 413d may have a red circular shape and blink before the setting is completed. Each of the four virtual vertex areas 413a, 513b, 413c, and 413d may have a green circular shape after the setting is completed, but these are exemplary colors.

The user holding the mobile terminal 100 may move to each vertex of the actual soccer field of the rectangular shape and select a virtual vertex area corresponding to an actual vertex among the four virtual vertex areas 413a, 513b, 413c, and 413d represented on the new field setting screen 407. For example, the user holding the mobile terminal 100 moves to a location of the actual soccer field corresponding to the virtual vertex area 413a, and then selects the virtual vertex area 413a. For the remained three virtual vertex areas, similar processes are performed.

The mobile terminal 100 may generate a virtual soccer field 413 on the basis of the location of the mobile terminal 100, which is obtained by using an input for selecting the virtual vertex area and the satellite signal. The mobile terminal 100 may obtain a first location of the mobile terminal 100, which corresponds to a selection input for selecting a first virtual vertex area 413a and the selected first virtual vertex area 413a from the GPS satellite. The first location may be obtained at the time of the selection input for selecting the first virtual vertex area 413a.

The mobile terminal 100 may obtain a second location of the mobile terminal 100, which corresponds to a selection input for selecting a second virtual vertex area 413b and the selected second virtual vertex area 413b, from the GPS satellite. The mobile terminal 100 may obtain a third location of the mobile terminal 100, which corresponds to a selection input for selecting a third virtual vertex area 413c and the selected third virtual vertex area 413c, from the GPS satellite. The mobile terminal 100 may obtain a fourth location of the mobile terminal 100, which corresponds to a selection input for selecting a fourth virtual vertex area 413d and the selected fourth virtual vertex area 413d, from the GPS satellite. The mobile terminal 100 may generate the virtual soccer field 413 on the basis of the obtained first, second, third, and fourth locations.

In the process that the mobile terminal 100 generates the virtual soccer field 413, the shape of the virtual soccer field 413 may not have the precise rectangular shape. In this case, the mobile terminal 100 may set the shape of the virtual soccer field 413 according to whether the generated virtual soccer field is in an error tolerable range area. Description about this is provided with reference to FIGS. 8 to 10.

FIG. 8 illustrates a GPS error tolerable range area 415 that points are connected in a rectangle, wherein the points are separated in a horizontal direction by 1 meter and in a vertical direction by 1 meter from each of virtual vertexes 414a, 414b, 414c, and 414d of the virtual soccer field 413. Here, 1 meter may represent an actual distance separated from vertexes of the actual soccer field and is just a numerical example. When a virtual soccer field 416 does not have a rectangular shape and is included in the GPS error tolerable range area 415, the mobile terminal 100 may correct the virtual soccer field 416 into the virtual soccer field 413 of the rectangular shape. Here, the virtual soccer field 413 may be a reference field for making a soccer field to be newly registered to have a rectangular shape.

FIGS. 9(a) to 9(c) illustrate a new field setting screen 407 when a virtual soccer field is included in the GPS error tolerable range area. FIG. 9(a) illustrates a process that the user selects the virtual vertex areas 413a, 413b, 413c, and 413d, and FIG. 9(b) illustrates a state where the selection of the virtual vertex areas 413a, 413b, 413c, and 413d is completed. FIG. 9(c) illustrates a process of setting a goalpost of a team to which the user belongs. When a goalpost area 417 is selected in FIG. 9(c), the selected goalpost area 417 may be set as a goalpost of the team to which the user belongs. In addition, an object A corresponding to a current location of the user (or a current location of the mobile terminal 100) may be represented on the generated new soccer field 413.

FIG. 10 illustrates the new field setting screen 407 in a case where the virtual soccer field is not included in the GPS error tolerable range area.

When a virtual soccer field 418 generated based on the user's selection input for the vertex areas and locations of the mobile terminal 100 is out of the GPS error tolerable range area, the mobile terminal 100 may provide a popup window 419 inquiring whether to regenerate a virtual soccer field or to set a new field as the virtual soccer field 418 of not having the rectangular shape. When <Re-try> button is selected on the popup window 419, the mobile terminal 100 provides the new field setting screen 407 as shown in FIG. 7. When <Ignore> button is selected, the mobile terminal 100 registers the virtual soccer field 418 of not having the rectangular shape as a new soccer field.

Description is made with reference to FIG. 2 again.

When the existing field tab included in the field setting screen is selected (operation S121), the control unit 180 may display a previously registered field list through the display unit 151 (operation S123). The field list may include one or more fields that the user previously registered.

The control unit 180 receives selection for a specific field on the displayed field list and performs setting for the existing field according to a setting input for the selected field (operation S125). The setting for the existing field may include a process of setting a goalpost of a team to which the user belongs. The user may select a field where the user is currently positioned. Description about operations S121 to S125 is provided with reference to FIGS. 11 and 12.

FIGS. 11 and 12 illustrate user interface screens that use the previously registered field list according to an embodiment.

Referring to FIG. 11, when the existing field tab 420 is selected on the field setting screen 400, the mobile terminal 100 may display the previously registered field list 421. The field list 421 may include one or more existing fields. In an embodiment, the one or more existing fields may be arrayed on the basis of a distance between the location of the mobile terminal 100 and each of the fields. In detail, the one or more existing fields may be arrayed in an ascending order of the distance between the location of the mobile terminal 100 and each of the fields.

Referring FIG. 12, when a specific field is selected on the field list 421, the mobile terminal 100 may display a goalpost setting screen 423 for setting a goalpost of a team to which the user belongs. When a goalpost area 417 included in the goalpost setting screen 423 is selected, the mobile terminal may set a half area of the virtual soccer field corresponding to the goalpost area 417 as an area of the team to which the user belongs. The object A representing the location of the user may be displayed on the virtual soccer field. The object A may be moved correspondingly to movement of the location of the user (the location of the mobile terminal 100).

When the goalpost area 417 included in the goalpost setting screen 423 is set, a popup window 427 for representing that the setting is completed may be provided on a setting completion screen 425.

Description is provided with reference to FIG. 2 again.

When the field sharing tab included in the field setting screen is selected (operation S127), the control unit 180 may display the previously registered field list through the display unit 151 (operation 129). When the share field tab may be a tab for sharing information on the registered field with a sharing partner. The sharing partner may include at least any one of other users, a team to which the user belongs, and other teams.

The control unit 180 obtains a selection input for selecting a specific field on the field list through the user input unit 123 (operation S131), and displays registered sharing partners on the display unit 151 according to the obtained selection input through the display unit 151 (operation S133).

The control unit 180 may obtain a selection input for selecting a specific sharing partner on the registered sharing partner list through the user input unit 123 (operation S135), and transmits information on the selected field to a mobile terminal of the selected sharing partner according to the obtained selection input (operation S137).

Description about operations S127 to S137 is made with reference to FIGS. 13 to 15.

FIGS. 13 to 15 illustrate user interface screens for sharing information on the field with a sharing partner according to an embodiment.

As illustrated in FIG. 13, when the share field tab 430 is selected on the field setting screen 400, the mobile terminal 100 may provide the previously registered field list 431. When a specific field is selected on the field list 431, the mobile terminal 100 may provide a sharing partner screen 433 for sharing information on the selected field with the sharing partner. Referring to FIG. 14, the sharing partner screen 433 may include a user list 435 including one or more other users. A specific user is selected on the user list 435 and <OK> button is selected, the mobile terminal 100 may transmit information on the selected field to a mobile terminal of the selected other user. The mobile terminal of the other user may have a sports application installed therein. The other user does not have to perform a process of setting an additional new field through the received information on the field.

Referring to FIG. 15, the sharing partner screen 437 may include a team list 439 including one or more teams. The team list 439 may include the team to which the user belongs and other teams. When a specific team is selected on the team list 439 and <OK> button is selected, the mobile terminal 100 may transmit information on the selected field to mobile terminals of users belonging to the selected team. The users belonging to the selected team do not have to perform a process of setting an additional new field through the received information on the field.

Next, an operation method of a mobile terminal according to another embodiment is described with reference to FIGS. 16 to 41.

FIG. 16 is a view for explaining a terminal system according to an embodiment.

Referring to FIG. 16, a terminal system according to an embodiment includes a mobile terminal 100, a wearable device 200 and a server 500.

The mobile terminal 100 and the wearable device 200 may transmit/receive information through wireless communication. The mobile terminal 100 may recognize a presence of the wearable device 200 located around the mobile terminal 100. The mobile terminal 100 may interlock with the wearable device 200 registered by the user among a plurality of wearable devices.

The wearable device 200 according to an embodiment is a detachable device from a body of the user and may be a device capable of obtaining information on the body of the user and exercise information when the user exercises. The wearable device 200 may include, but is not limited to, a watch or a band type wearable on the wrist or the ankle, and is only a wearable type on the body part of the user, such as a head set wearable on the head of the user, an earphone, or a shoe of the user.

The server 500 may receive body information, exercise information, and location information on the user from the mobile terminal 100 or the wearable device 200. The server 500 may provide an exercise result of the user to the mobile terminal 100 on the basis of the received body information, exercise information, and location information on the user.

The body information on the user may include information of the body part of the user, such as electrocardiogram (ECG) data, the heart rate, the temperature or the blood pressure.

The exercise information on the user may include the pulse rate, an exercise distance, an exercise time, the number of steps, a target, and an achievement.

The location information on the user may be location information on the wearable device 200 that the wearable device 200 receives from a GPS satellite.

FIG. 17 is a block diagram of the wearable device according to an embodiment.

The wearable device 200 may include a communication unit 210, a display unit 230, a detecting unit 250, a memory unit 270 and a control unit 290.

The communication unit 210 may exchange information with the wireless communication unit 110 of the mobile terminal 100 through wireless communication. In particular, the communication unit 210 may obtain the body information, the exercise information and the location information on the user and transmit them to the wireless communication unit 110 of the mobile terminal 100. The communication unit 210 may include a GPS module. The GPS module may receive a location of the wearable device 200 from a GPS satellite in real time, and transmit the received location of the wearable device 200 to the mobile terminal 100. The location of the wearable device 200 may be used for generating an activity area of the user to be described later.

The communication unit 210 may receive a control command from the wireless communication unit 110 of the mobile terminal 100. Description about this will be provided later.

The display unit 230 may display an image signal or an audio signal processed by the control unit 290.

The detecting unit 250 may detect a body state of the user. The detecting unit 250 may detect the heart rate, the temperature, the blood pressure of the user. To this end, the detecting unit 250 may include an ECG sensor, a thermometer, and a blood pressure gauge.

The detecting unit 250 may detect an exercise state of the user. The detecting unit 250 may include an acceleration sensor, a vibration sensor, or etc., for checking an exercise state of the user.

The memory unit 270 may store signals processed by the control unit 290 and a program for controlling the signal processing. In addition, the memory unit 270 may store signal-processed images, voices, or data signals.

The control unit 290 may control overall operations of the wearable device 200. The control unit 290 may transmit exercise information on the user to the mobile terminal 100 through the communication unit 210.

The control unit 290 may receive control commands from the mobile terminal 100 and control functions of the wearable device 200, which correspond to the control commands.

FIG. 18 is a flowchart for explaining an operation method of a mobile terminal according to another embodiment.

The control unit 180 of the mobile terminal 100 executes a sports application (operation S305). The sports application may be an application that a user sets information on a sports game and a sports game result is provided to the user. The sports game may be, but is not limited to, any one of soccer, baseball, basketball, tennis, and ice hockey, and may include all sports games.

Hereinafter, the sports game is assumed as soccer and description thereabout is made.

The control unit 180 of the mobile terminal 100 provides an initial user interface screen through the display unit 151 according to execution of the sports application (operation S307). The initial user interface screen is a screen for setting information on the sports game or for providing a result of a sports game performed by the user. Description is made about the initial user interface screen provided by execution of the sports application with reference to FIG. 19.

FIG. 19 is a view for explaining an initial user interface screen of a sports application according to an embodiment.

Description is omitted about repetitive parts in relation to FIG. 3 among contents of the initial interface screen described in relation to FIG. 19.

An initial user interface screen 300 may include a profile information area 310, a recent game result area 320, a game record area 330, a team strategy area 340, a synchronization area 350, and a field area 360.

The team strategy area 340 is an area for providing information on other users. When the team strategy area 340 is selected, an opponent list may be provided. When a specific other user is selected on the opponent list, the mobile terminal 100 may provide information on the selected other user.

The synchronization area 350 may be an area for receiving the body information, exercise information, and location information on the user from the wearable device 200 and providing a game analysis result on the basis of the received information.

Description is made with reference to FIG. 18 again.

When the synchronization area is selected on the initial user interface screen (operation S309), the control unit 180 of the mobile terminal 100 performs synchronization with the wearable device 200 (operation S311).

In an embodiment, the synchronization may represent a process of obtaining information on the user from the wearable device 200. The synchronization may be a process that the mobile terminal 100 creates information on a game result on the basis of the exercise information on the user, which is received from the wearable device 200.

The control unit 180 of the mobile terminal 100 may receive user information from the wearable device 200 through the short range communication module 114 of the wireless communication unit 110. The user information may include one or more of the body information, exercise information, and location information on the user.

In another embodiment, when the synchronization area is selected on the initial user interface screen to be described later, the mobile terminal 100 may transmit user information received from the wearable device 200 to the server 500. The control unit 180 of the mobile terminal 100 may transmit user information received through the wireless internet module 113 of the wireless communication unit 110 to the server 500, and may obtain information on a game result from the server 500.

In another embodiment, when the synchronization area is selected on the initial user interface screen, the mobile terminal 100 may not transmit the user information to the server 500. The mobile terminal 100 may autonomously obtain information on the game result by using the user information received from the wearable device 200 and the installed sports application.

The control unit 180 of the mobile terminal 100 performs synchronization with the wearable device 200 and then obtains a selection input for selecting a game result tab through the user input unit 123 (operation S313).

The control unit 180 of the mobile terminal 100 provides a game result screen according to the selection input of the game result tab obtained through the display unit 151 (operation S315).

Description about operations S311 to S315 is made with reference to FIGS. 20 and 21.

FIGS. 20 and 21 illustrate user interface screens providing a game result by performing synchronization according to an embodiment.

When the synchronization area 350 is selected on the initial user interface screen 300 illustrated in FIG. 19, the mobile terminal 100 may display a synchronization screen 700 for providing a transfer inquiry window 351 inquiring whether to transfer data for a user's game, as illustrated in FIG. 20a.

When <YES> button is selected on the transfer inquiry window 351, the mobile terminal 100 may display a game data input window 352 as illustrated in FIG. 20(b). The user may input, through the game data input window 352, game time data representing whether the user plays a game full time or half time (first half or second half), winning team data for selecting a winning team or an opponent team of today's game, or game record data for inputting game record (goals, assists) of the user.

When <complete> button is selected on the game data input window 352, the mobile terminal 100 may provide the synchronization screen 700 representing a synchronization procedure as illustrated in FIG. 20(c). When the synchronization is completed, a game result tab 353 included in the synchronization screen 700 may be activated. The activation of the game result tab 353 may be represented as the game result tab 351 highlighted.

When the game result tab 353 is selected, the mobile terminal 100 may provide a game result screen 710 as illustrated FIG. 21.

The game result screen 710 includes a user's profile information area 711, a date area 712, a position tab 713, a speed tab 714, an activity tab 715, a share tab 716, a virtual soccer field area 717, and a comment area 718.

The user's profile information area 711 may include information on the user of the mobile terminal 100 and the wearable device 200 interlocked with the mobile terminal 100. Information on the user may include a user's name, age, height, weight, and user's game record.

The date area 712 may be an area for providing a specific data in order to provide a game result on a specific date. The user may select a date desired to obtain a game result through the date area 712.

The position tab 713 may a tab for providing an activity area where the user moves and providing a proper position to the user on the basis of the activity area.

The speed tab 714 may be a tab for providing user's average speed, user's maximum speed, and the number of times when the user sprints at full speed.

The activity tab 715 is a tab for providing an activity amount of the user and the activity amount of the user includes a time when the user plays, user's total number of steps, a total activity distance, calories burned, ratios of user's walk, running, and sprint.

The share tab 716 may be a tab for sharing information on the game result with a sharing partner.

The virtual soccer field area 717 is a virtually generated area in correspondence to an actual soccer field area, and may be generated in the same manner as described in relation of FIGS. 2 to 10. The virtual soccer field area 717 may include a user's activity area generated on the basis of the user's location information. In other words, the mobile terminal 100 may obtain locations of the user who wears the wearable device 200 in real time from the wearable device 200 from a game start time to a game end time, and display the user's activity area on the virtual soccer field area 717 on the basis of the obtained locations of the user.

Each activity area 719 may be formed in a plurality of colors, and the plurality of colors include red, yellow, green, and blue. Each activity area 719 may represent portions in which user activity is great in the order of areas corresponding to red, yellow, green, and blue. The user may easily grasp areas where he or she moves in the soccer field at a glance through activity areas displayed on the virtual soccer field area 717.

The comment area 718 may be an area for providing comments on a game result of the user, which is received from another user.

Description is made with reference to FIG. 18 again.

When the position tab is selected on the provided game result screen (operation S317), the control unit 180 of the mobile terminal 100 provides an activity result of the user through the display unit 151 (operation S319). In an embodiment, the activity result of the user may be a user' activity area provided on the virtual soccer field area 171 of FIG. 21. Description about the user' activity area is the same as that in relation to FIG. 21.

In an embodiment, the mobile terminal 100 may recommend a user's main position on the basis of the user's activity area. In other words, the mobile terminal 100 may compare an area where the user moves in the soccer field with an activity area corresponding to each preset position, and recommend a position proper to the user according to the comparison result.

Description about the user's result is provided in detail with reference to FIGS. 22 to 25.

FIGS. 22 to 25 illustrate user interface screens providing the user' activity result according to various embodiments.

When the virtual soccer field area 717 is selected according to a user input in FIG. 21, the mobile terminal 100 may provide an activity area analysis screen 720 through the display unit 151.

The activity area analysis screen 720 may include a time period activity bar area 721 and a virtual soccer field area 722. The time period activity bar area 721 may include a plurality of time periods and may be an area for providing a user's movement area for each time period on the virtual soccer field area 722.

In the time period activity bar area 721, a total game time may be divided into a plurality of time periods from a game start time to a game end time. Each time period may be 10 min., but is just an example and may be differed according to user's setting.

When one time period is selected from among the plurality of time periods, the mobile terminal 100 may provide user's activity area for the selected time period. As illustrated in FIG. 23, when one time period 721a is selected from among the plurality of time periods, the mobile terminal may provide a user's activity area 728 corresponding to the selected time period 721a on the virtual soccer field area 722.

A play button 725a may be displayed on the right top portion of the virtual soccer field area 722. When the play button 725a is selected by the user input, the mobile terminal 100 plays a user's activity trajectory 727 along time flow as illustrated FIG. 24. The user may select a stop button 725b and see the stopped user's activity trajectory 727. When the play in the selected time period is completed, the mobile terminal may provide a user's entire activity trajectory 728 for a corresponding time period as illustrated in FIG. 25.

Description is made with reference to FIG. 18 again.

Moreover, when a speed tan is selected on the provided game result screen (operation S321), the control unit of the mobile terminal 100 provides information on user' speed through the display unit 151. The control unit 180 may obtain the information on the user's speed on the basis of the received exercise information on the user from the wearable device 200. The user's exercise information may include user's movement speed per unit time. To this end, the detecting unit 250 of the wearable device 200 may include a speed sensor for measuring the user's movement speed. Description about operations S321 and S323 is provided with reference to FIG. 26.

FIG. 26 is a view for explaining a user interface screen providing user's speed information according to an embodiment.

Referring to FIG. 26, when the speed tab 714 is selected on the game result screen 710, the mobile terminal 100 may provide a speed analysis result area 714a. The speed analysis result area 714a is a result screen of analyzing user's movement speed for the entire game time. The speed analysis result area 714a may include an average speed, a maximum speed, and the number of times that the user moves at full speed. In addition, the speed analysis result area 714a may include an average speed, a maximum speed, and the number of times that the user moves at full speed for each time period, which are represented in graph.

Description is made with reference to FIG. 18 again.

Moreover, when an activity tab is selected on the provided game result screen (operation S325), the control unit 180 of the mobile terminal 100 provides information on the user's activity amount through the display unit 151 (operation S327). The control unit 180 may obtain the information on the user's activity amount on the basis of user's exercise information received from the wearable device 200. The user's exercise information may include the total number of steps, user's exercise time, user's movement speed per unit time, or etc. Description about operations S325 to S327 is made with reference to FIG. 27.

FIG. 27 is a view for explaining a user interface screen for providing user's activity amount information according to an embodiment.

Referring to FIG. 27, when the activity tab 715 is selected on the game result screen 710, the mobile terminal 100 may provide an activity amount result area 715a. The activity amount result area 715a may include a total exercise time, total movement distance, and calorie burned of the user. In addition, the activity amount result area 715a may also include an analysis result of a walk ratio, a running ratio, and a sprint ratio of a total exercise ratio.

Description is provided with reference to FIG. 18 again.

When the share tab is selected on the provided game result screen (operation S329), the control unit 180 of the mobile terminal 100 shares the game result through the display unit 151 (operation S331). In an embodiment, the game result may be at least any one of information on the user's activity area, information on the user's speed, and information on the user's activity amount described in relation to FIGS. 21 to 27. Description about operations S329 and S331 is provided with reference to FIGS. 28 to 30.

Figure 30:
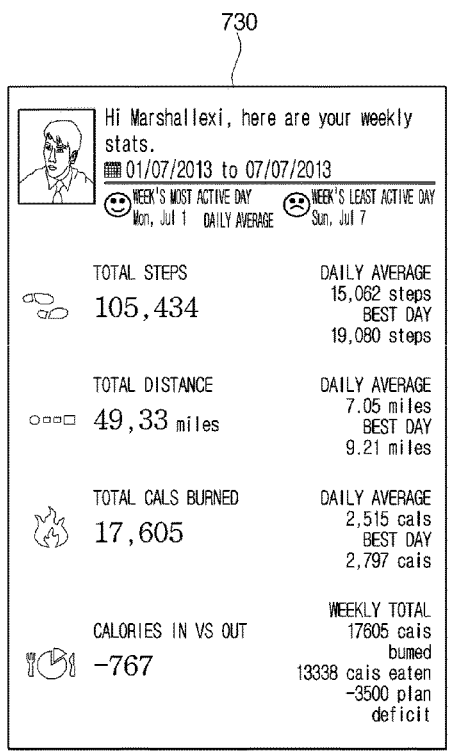

FIGS. 28 to 30 are user interface screens for explaining examples of sharing game result of the user with the sharing partner according to embodiments.

Referring to FIG. 28, when the share tab 716 is selected on the gamer result screen 710, the mobile terminal 100 may provide a share information area 715a. The share information area 715a may include a representative image summarizing the game result, user's comment for the game result, and social network service (SNS) sites for sharing the game result. When the user selects any one web site among a plurality of wed sites, the mobile terminal 100 may, as illustrated in FIG. 29, access the corresponding web site and provide a login screen 750 for logging in to the accessed web site. When the user logs in to the web site, the mobile terminal 100 may, as illustrated in FIG. 30, post the user's game result on a web site screen 770 of the user's account of the accessed web site.

Description is provided with reference to FIG. 18 again.

When the team strategy area is selected on the initial user interface screen (operation S333), the control unit 180 of the mobile terminal 100 provides information on an opponent through the display unit 151 (operation S335). According to an embodiment, the information on the opponent may be information on a game result of another user. The information on the other user's game result may include information on the other user's activity area, information on the other user's speed, information on the other user's activity amount, the other user's profile information, the other user's statistics information, and etc.

The control unit 180 of the mobile terminal 100 may set a team strategy by using information on the opponent and a user input (operation S337).

The control unit 180 of the mobile terminal 100 may share the set team strategy with the opponent (operation S339).

Description about operations S333 to S339 is provided with reference to FIGS. 31 to 41.

FIGS. 31 to 41 illustrate exemplary screens provided when the team strategy area is selected on the initial user interface screen according to embodiments.

When the team strategy area 340 is selected on the initial user interface screen 300 illustrated in FIG. 31, the mobile terminal 100 provides a team strategy setting screen 800 illustrated in FIG. 32.

The team strategy setting screen 800 may include a peer tab 810, an invite tab 820, and a team board tab 850. The peer tab 810 is a tab for providing information on other users in a team to which the user belongs. The invite tab 820 is a tab for inviting users in the team to which the user belongs or in another team. The team board tab 850 is a tab for setting a strategy of the team to which the user belongs.

When the peer tab 820 is selected in FIG. 32, the mobile terminal 100 may display a peer list 870 and a virtual soccer field area 890 on the team strategy setting screen 800. The peer list 870 may represent peers in the team to which the user belongs and include images of the peers. The mobile terminal 100 may show images of other peers, which are not displayed on one page according to a flicking input. In other words, the images of other peers may be displayed on the team list 870 through a slide manner. The virtual soccer field area 890 may be a virtual soccer field pre-registered by the user.

Referring to FIG. 33, when an image F1 corresponding to a peer displayed on the peer list 870 is dragged and dropped to the virtual soccer field area 890 by a user input, the mobile terminal 100 may display an activity area 891, profile information 893 and statistics 895 of the corresponding peer on the virtual soccer field area 890.

When the team board tab 850 is selected in FIG. 34, the mobile terminal 100 may display areas for setting the team strategy. In other words, when the team board tab 850 is selected, the mobile terminal 100 may further display a team formation setting area 820, a team strategy use area 840, and the virtual soccer field area 890.

The team formation setting area 820 may be an area for setting tactical deployment of team members in the team to which the user belongs. The team strategy use area 840 may be an area for storing the set team formation or sharing it with team members. The virtual soccer field area 890 may be an area for displaying a plurality of team member objects 892 representing the team members according to the team formation setting.

When a 4-4-2 tab 821 is selected on the team formation setting area 820, the mobile terminal 100 may deploy the plurality of team member objects 892 on the virtual soccer field area 890 according to 4-4-2 formation.

Furthermore, referring to FIG. 35, after a 4-3-3 tab 822 is selected on the team formation setting area 820, when an image F1 of a specific peer on the peer list 870 is selected and a drag and drop input for moving the selected image F1 to a specific peer object 893 is received, the mobile terminal 100 may display an activity area of a peer corresponding to the image F1, profile information and statistics on the corresponding peer may be displayed on the virtual soccer field area 890. The mobile terminal 100 may obtain in advance information on another user for a game result on a specific date. The mobile terminal 100 may obtain the information on the other user for the game result on the specific date from the server 500 or the other user's mobile terminal.

In another embodiment, when an image F1 of a specific peer is selected on the peer list 870, and a drag and drop input for moving the selected image F1 to a specific team member object 893 is received, the mobile terminal 100 may display only a nickname corresponding to the image F1. In this case, when an input for selecting the team member object 893 is received once, the mobile terminal 100 may display a graph representing the profile information and statistics of the corresponding team member. In addition, when the input for selecting the team member object 893 is received twice, the mobile terminal 100 may display again only the nickname of the corresponding team member.

Moreover, referring to FIG. 36, an overall team activity area view button 895 for providing an overall activity area of team members may be displayed on the virtual soccer field area 890 of the team strategy setting screen 800. When the overall team activity area view button 895 is selected, the mobile terminal 100 may display an activity area for each team member corresponding to each of the plurality of team member objects on the virtual soccer field area 890.

Referring to FIG. 37, the team formation setting area 820 may further include a self-adjustment button 825. When the self-adjustment button 825 is selected, the mobile terminal 100 may redeploy each of the plurality of team member objects according to a user input while displaying the activity areas of the team members. For example, when the team formation is set as a 4-3-3 format, the mobile terminal 100 may move a team member object 896 to another location according to a user input, and display the moved team member object 897 on the virtual field area 890. The user sees the activity areas of the team members and may set proper locations for the corresponding team members on the basic formation.

Referring to FIG. 38, when the self-adjustment 825 is selected, the mobile terminal 100 may not display the activity areas of the team members and may redeploy each of the plurality of team member objects according to a user input. In other words, when the team formation is set as the 4-3-3 format, the mobile terminal 100 may move a team member object 898 to another location according to the user input, and display the moved team member object 899 on the virtual soccer field area 890. The user may deploy locations of the team members on a formation provided by default to desired locations without activity areas of the team members.

Referring to FIG. 39, the team strategy use area 840 may include a save button 841, a replay button 843 and a share button 845. The save button 841 may be a button for saving the team formation set by the user. The replay button 843 may be a button for fetching the team formation set by the user. The share button 845 may be a button for sharing the set team formation with a sharing partner. When the share button 845 is selected, the mobile terminal 100 may provide a sharing partner screen 433 for sharing the set team formation with the sharing partner as illustrated in FIG. 40. The sharing partner screen 433 may include a user list 435 including one or more other users. When a specific user is selected on the user list 435 and <OK> button is selected, the mobile terminal 100 may transmit information on a team strategy to a mobile terminal of the selected other user. A sports application may be installed in the mobile terminal of the other user.

Referring to FIG. 41, the sharing partner screen 437 may include a team list 439 including one or more teams. The team list 439 may include the team to which the user belongs and other teams. When a specific team is selected on the team list 435 and <OK> button is selected, the mobile terminal 100 may transmit information on the team strategy to mobile terminals of users belonging to the selected team.

The invention can also be embodied as computer readable codes on a computer readable recording medium. The computer readable recording medium is any data storage device that can store data which can be thereafter read by a computer system. Examples of the computer readable recording medium include hard disk drives (HDDs), solid state disks (SSDs), silicon disk drives (SDDs), ROMs, RAMs, CD-ROMs, magnetic tapes, floppy disks, and optical data storage devices, and also include carrier waves (such as data transmission through the Internet). Furthermore, the computer may include the control unit 180 of the terminal.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. An operation method of a mobile terminal, comprising:
   executing a sport application;
   displaying an executed screen of the sport application;
   obtaining at least one of exercise information and location information on a user from a wearable device; and
   providing a game result or setting a team strategy of a game that the user performs on the basis of the obtained at least one of exercise information and location information,
   wherein the executed screen of the sport application includes a new field setting screen, and
   wherein the method further comprises:
   generating a virtual soccer field using a plurality of locations of the mobile terminal and a plurality of inputs for selecting a plurality of virtual vertex areas included on the new field setting screen, each of the plurality of locations of the mobile terminal being obtained when each of the plurality of inputs is received, and
   correcting the generated virtual soccer field into a new virtual soccer field having a rectangular shape when the virtual soccer field does not have a rectangular shape and is included in a GPS error tolerable range area.

2. The operation method according to claim 1, further comprising:
   receiving an input for a game performance result by a user; and
   performing synchronization with the wearable device on the basis of the received input,
   wherein the providing of the game result comprises providing a game result screen including the game result according to the performing of the synchronization.

3. The operation method according to claim 2, further comprising providing an activity area analysis screen including the activity area of user on the basis of the obtained exercise information and location information, when a position tab for setting an activity area and a position of the user is selected on the game result screen.

4. The operation method according to claim 3, wherein the activity area analysis screen comprises a plurality of time periods, and
   the providing of the activity area analysis screen comprises providing the user' activity area for a selected time period, when any one time period among the plurality of time periods is selected.

5. The operation method according to claim 2, further comprising providing speed information including a user's average speed, a user's maximum speed, the number of times of sprints representing the number of times that the user moves at full speed.

6. The operation method according to claim 2, further comprising providing activity information including a game time, a total moving distance, and calorie burned of the user on the basis of the exercise information, when an activity tab for providing information on an activity amount of the user on the game result screen.

7. The operation method according to claim 2, further comprising providing a social network service (SNS) site list, when a share tab for sharing a game result on the game result screen with a sharing partner; and
   accessing a specific SNS site and sharing the game result.

8. The operation method according to claim 1, further comprising obtaining information on a game result of another user, wherein the setting of the team strategy comprises setting the team strategy on the basis of at least one of a result for a game performed by the user and the obtained game result of the other user.

9. The operation method according to claim 8, further comprising receiving an input for setting the team strategy and providing a team strategy setting screen, wherein the team strategy setting screen comprises a virtual field area corresponding to an actual field, and the setting of the team strategy comprises,
providing activity areas of the user and the other user on the basis of the result of the game performed by the user and the obtained game result of the other user, and
setting the team strategy on the basis of the provided activity areas of the user and the other user.

10. The operation method according to claim 9, further comprising sharing the set team strategy with the other user or team members.

11. A mobile terminal comprising:
a display unit configured to display a user interface screen including a new filed setting screen;
a user input unit configured to receive a user input;
a wireless communication unit configured to obtain at least one of exercise information and location information on a user from a wearable device; and
a control unit configured to provide a result of a game performed by the user and setting a team strategy on the basis of the obtained at least one of exercise information and location information,
wherein the wireless communication unit includes a location information module which obtains a location of the mobile terminal, and
wherein the control unit is further configured to:
generate a virtual soccer field using a plurality of locations of the mobile terminal and a plurality of inputs for selecting a plurality of virtual vertex areas included on the new field setting screen, each of the plurality of locations of the mobile terminal being obtained when each of the plurality of inputs is received, and
correct the generated virtual soccer field into a new virtual soccer field having a rectangular shape when the virtual soccer field does not have a rectangular shape and is included in a GPS error tolerable range area.

12. The mobile terminal according to claim 11, wherein the control unit receives an input for a game performance record of the user and performs synchronization with the wearable device on the basis of the received input, and provides a game result screen including the game result according to the synchronization result.

13. The mobile terminal according to claim 12, wherein the control unit provides an activity area analysis screen including a user's activity area on the basis of the obtained exercise information and location information, when a position tab for setting the activity area and a position of the user is selected on the game result screen.

14. The mobile terminal according to claim 13, wherein the activity area analysis screen comprises a plurality of time periods and the control unit provides a user's activity area for a selected time period, when any one time period is selected from among the plurality of time periods.

15. The mobile terminal according to claim 12, wherein the control unit provides speed information comprising a user's average speed, a user's maximum speed, the number of times of sprints representing the number of times that the user moves at full speed, when a speed tab for providing information on a user's speed is selected on the game result screen.

16. The mobile terminal according to claim 12, wherein the control unit provides activity information comprising a user's game playing time, a user's total movement distance, and calorie burned of the user on the basis of the exercise information, when an activity tab for providing information on an activity amount of the user on the game result screen.

17. The mobile terminal according to claim 12, wherein the control unit provides an SNS site list, accesses a specific SNS site and shares the game result, when a share tab for sharing the game result with a sharing partner is selected on the game result screen.

18. The mobile terminal according to claim 11, wherein the controller obtains information on a game result of another user, and sets a team strategy on the basis of the result of the game performed by the user and the obtained game result of the other user.

19. The mobile terminal according to claim 18, wherein the control unit receives an input for setting the team strategy and provides a team strategy setting screen,
the team strategy setting screen comprises a virtual field area corresponding to an actual field, and
the control unit provides activity areas of the user and the other user on the basis of the result of the game performed by the user and the obtained game result of the other user, and sets the team strategy on the basis of the provided activity areas of the user and the other user.

20. The mobile terminal according to claim 19, wherein the control unit shares the set team strategy with the other user or team members.

* * * * *